US012361512B2

(12) United States Patent
Zheng et al.

(10) Patent No.: US 12,361,512 B2
(45) Date of Patent: Jul. 15, 2025

(54) GENERATING DIGITAL IMAGES UTILIZING HIGH-RESOLUTION SPARSE ATTENTION AND SEMANTIC LAYOUT MANIPULATION NEURAL NETWORKS

(71) Applicant: Adobe Inc., San Jose, CA (US)

(72) Inventors: Haitian Zheng, Rochester, NY (US); Zhe Lin, Fremont, CA (US); Jingwan Lu, Santa Clara, CA (US); Scott Cohen, Sunnyvale, CA (US); Jianming Zhang, Campbell, CA (US); Ning Xu, Milpitas, CA (US)

(73) Assignee: Adobe Inc., San Jose, CA (US)

( * ) Notice: Subject to any disclaimer, the term of this patent is extended or adjusted under 35 U.S.C. 154(b) by 86 days.

(21) Appl. No.: 18/298,630

(22) Filed: Apr. 11, 2023

(65) Prior Publication Data

US 2023/0245266 A1 Aug. 3, 2023

Related U.S. Application Data

(63) Continuation of application No. 17/220,543, filed on Apr. 1, 2021, now Pat. No. 11,636,570.

(51) Int. Cl.
*G06T 3/18* (2024.01)
*G06T 9/00* (2006.01)
(Continued)

(52) U.S. Cl.
CPC .............. *G06T 3/18* (2024.01); *G06T 9/002* (2013.01); *G06T 11/00* (2013.01); *G06V 10/46* (2022.01);
(Continued)

(58) Field of Classification Search
CPC . G06T 3/18; G06T 9/002; G06T 11/00; G06T 2210/36; G06T 3/4046;
(Continued)

(56) References Cited

U.S. PATENT DOCUMENTS 11,481,925 B1\* 10/2022 Li .............................. G06T 7/75
2010/0164950 A1\* 7/2010 Zhao ...................... A61B 34/20
345/419

(Continued)

OTHER PUBLICATIONS

Xingran Zhou, Bo Zhang, Ting Zhang, Pan Zhang, Jianmin Bao, Dong Chen, Zhongfei Zhang, and Fang Wen. Full-resolution correspondence learning for image translation. arXiv preprint arXiv:2012.02047 (Year: 2020).\*

(Continued)

*Primary Examiner* — Michael Le
(74) *Attorney, Agent, or Firm* — Keller Preece PLLC

(57) ABSTRACT

This disclosure describes one or more implementations of a digital image semantic layout manipulation system that generates refined digital images resembling the style of one or more input images while following the structure of an edited semantic layout. For example, in various implementations, the digital image semantic layout manipulation system builds and utilizes a sparse attention warped image neural network to generate high-resolution warped images and a digital image layout neural network to enhance and refine the high-resolution warped digital image into a realistic and accurate refined digital image.

20 Claims, 18 Drawing Sheets

(51) Int. Cl.
*G06T 11/00* (2006.01)
*G06V 10/46* (2022.01)
*G06V 30/24* (2022.01)

(52) U.S. Cl.
CPC ...... *G06V 30/2504* (2022.01); *G06T 2210/36* (2013.01)

(58) Field of Classification Search
CPC .... G06T 11/60; G06V 10/46; G06V 30/2504; G06V 10/82
See application file for complete search history.

(56) References Cited

U.S. PATENT DOCUMENTS

| | | | | |
|---|---|---|---|---|
| 2013/0156339 | A1* | 6/2013 | Hayata | G06T 5/50 382/268 |
| 2015/0243080 | A1* | 8/2015 | Steinbach | G06T 3/00 345/633 |
| 2016/0148362 | A1* | 5/2016 | Bedi | G06T 5/77 382/180 |
| 2018/0260668 | A1* | 9/2018 | Shen | G06V 10/82 |
| 2018/0268220 | A1* | 9/2018 | Lee | G06V 10/454 |
| 2019/0251401 | A1 | 8/2019 | Shechtman et al. | |
| 2019/0340462 | A1* | 11/2019 | Pao | G06V 10/82 |
| 2019/0371080 | A1* | 12/2019 | Sminchisescu | G06T 17/20 |
| 2020/0242774 | A1 | 7/2020 | Park et al. | |
| 2020/0349772 | A1* | 11/2020 | Tkach | G06V 20/647 |
| 2020/0356827 | A1* | 11/2020 | Dinerstein | G06T 3/4007 |
| 2021/0097691 | A1* | 4/2021 | Liu | G06V 10/764 |
| 2021/0158081 | A1* | 5/2021 | Devitt | G06V 10/7715 |
| 2021/0166304 | A1* | 6/2021 | Kim | G06Q 30/08 |
| 2021/0227126 | A1* | 7/2021 | Se | G06V 10/764 |
| 2021/0248378 | A1* | 8/2021 | Sang | G06T 7/215 |
| 2021/0256766 | A1* | 8/2021 | Muhlethaler | G06F 3/012 |
| 2021/0358164 | A1* | 11/2021 | Liu | G06N 3/088 |
| 2022/0189087 | A1* | 6/2022 | Shuvi | G06T 11/60 |

OTHER PUBLICATIONS

Xingran Zhou, Bo Zhang, Ting Zhang, Pan Zhang, Jianmin Bao, Dong Chen, Zhongfei Zhang, and Fang Wen. Full-resolution correspondence learning for image translation. arXiv preprint arxXiv:2012.02047 (Year: 2020).*
Pan Zhang, Bo Zhang, Dong Chen, Lu Yuan, and Fang Wen. Cross-domain correspondence learning for exemplar-based image translation. In Proceedings of the IEEE/CVF Conference on Computer Vision and Pattern Recognition, pp. 5143-5153 (Year: 2020).*
Martin Arjovsky, Soumith Chintala, and Leon Bottou. Wasserstein gan. arXiv preprint arXiv:1701.07875, 2017.
Dzmitry Bahdanau, Kyunghyun Cho, and Yoshua Bengio. Neural machine translation by jointly learning to align and translate. arXiv preprint arXiv:1409.0473, 2014.
Connelly Barnes, Eli Shechtman, Adam Finkelstein, and Dan B Goldman. Patchmatch: A randomized correspondence algorithm for structural image editing. ACM Trans. Graph., 28(3):24, 2009.
David Bau, Hendrik Strobelt, William Peebles, Bolei Zhou, Jun-Yan Zhu, Antonio Torralba, et al. Semantic photo manipulation with a generative image prior. arXiv preprint arXiv:2005.07727, 2020.
Andrew Brock, Jeff Donahue, and Karen Simonyan. Large scale gan training for high fidelity natural image synthesis. arXiv preprint arXiv:1809.11096, 2018.
Alex J Champandard. Semantic style transfer and turning two-bit doodles into fine artworks. arXiv preprint arXiv:1603.01768, 2016.
Huiwen Chang, Jingwan Lu, Fisher Yu, and Adam Finkelstein. Pairedcyclegan: Asymmetric style transfer for applying and removing makeup. In Proceedings of the IEEE Conference on Computer Vision and Pattern Recognition, pp. 40-48, 2018.
Qifeng Chen and Vladlen Koltun. Photographic image synthesis with cascaded refinement networks. In Proceedings of the IEEE International Conference on Computer Vision, pp. 1511-1520, 2017.

Yunpeng Chen, Yannis Kalantidis, Jianshu Li, Shuicheng Yan, and Jiashi Feng. A/\ 2-nets: Double attention networks. In Advances in Neural Information Processing Systems, pp. 352-361, 2018.
Ho Kei Cheng, Jihoon Chung, Yu-Wing Tai, and Chi-Keung Tang. Cascadepsp: Toward class-agnostic and very high-resolution segmentation via global and local refinement. In Proceedings of the IEEE/CVF Conference on Computer Vision and Pattern Recognition, pp. 8890-8899, 2020.
Taeg Sang Cho, Moshe Butman, Shai Avidan, and William T Freeman. The patch transform and its applications to image editing. In 2008 IEEE Conference on Computer Vision and Pattern Recognition, pp. 1-8. IEEE, 2008.
Shivam Duggal, Shenlong Wang, Wei-Chiu Ma, Rui Hu, and Raquel Urtasun. Deeppruner: Learning efficient stereo matching via differentiable patchmatch. In Proceedings of the IEEE International Conference on Computer Vision, pp. 4384-4393, 2019.
Alexei A Efros and William T Freeman. Image quilting for texture synthesis and transfer. In Proceedings of the 28th annual conference on Computer graphics and interactive techniques, pp. 341-346. ACM, 2001.
Alexei A Efros and Thomas K Leung. Texture synthesis by non-parametric sampling. In Proceedings of the seventh IEEE international conference on computer vision, vol. 2, pp. 1033-1038. IEEE, 1999.
Fartash Faghri, David J Fleet, Jamie Ryan Kiros, and Sanja Fidler. Vse++: Improving visual-semantic embeddings with hard negatives. arXiv preprint arXiv:1707.05612, 2017.
Leon A Gatys, Alexander S Ecker, and Matthias Bethge. A neural algorithm of artistic style. arXiv preprint arXiv:1508.06576, 2015.
Ian Goodfellow, Jean Pouget-Abadie, Mehdi Mirza, Bing Xu, David Warde-Farley, Sherjil Ozair, Aaron Courville, and Yoshua Bengio. Generative adversarial nets. In Advances in neural information processing systems, pp. 2672-2680, 2014.
Aaron Hertzmann, Charles E Jacobs, Nuria Oliver, Brian Curless, and David H Salesin. Image analogies. In Proceedings of the 28th annual conference on Computer graphics and interactive techniques, pp. 327-340, 2001.
Martin Heusel, Hubert Ramsauer, Thomas Unterthiner, Bernhard Nessler, and Sepp Hochreiter. Gans trained by a two time-scale update rule converge to a local nash equilibrium. In Advances in Neural Information Processing Systems, pp. 6626-6637, 2017.
Xun Huang, Ming-Yu Liu, Serge Belongie, and Jan Kautz. Multimodal unsupervised image-to-image translation. In Proceedings of the European Conference on Computer Vision (ECCV), pp. 172-189, 2018.
Zilong Huang, Xinggang Wang, Lichao Huang, Chang Huang, Yunchao Wei, and Wenyu Liu. Ccnet: Criss-cross attention for semantic segmentation. In Proceedings of the IEEE International Conference on Computer Vision, pp. 603-612, 2019.
Phillip Isola, Jun-Yan Zhu, Tinghui Zhou, and Alexei A Efros. Image-to-image translation with conditional adversarial networks. In Proceedings of the IEEE conference on computer vision and pattern recognition, pp. 1125-1134, 2017.
Justin Johnson, Alexandre Alahi, and Li Fei-Fei. Perceptual losses for real-time style transfer and super-resolution. In European conference on computer vision, pp. 694-711. Springer, 2016.
Tero Karras, Timo Aila, Samuli Laine, and Jaakko Lehtinen. Progressive growing of gans for improved quality, stability, and variation. arXiv preprint arXiv:1710.10196, 2017. Part 1.
Tero Karras, Timo Aila, Samuli Laine, and Jaakko Lehtinen. Progressive growing of gans for improved quality, stability, and variation. arXiv preprint arXiv:1710.10196, 2017. Part 2.
Tero Karras, Samuli Laine, and Timo Aila. A style-based generator architecture for generative adversarial networks. In Proceedings of the IEEE Conference on Computer Vision and Pattern Recognition, pp. 4401-4410, 2019.
Diederik P Kingma and Jimmy Ba. Adam: A method for stochastic optimization. arXiv preprint arXiv:1412.6980, 2014.
Hsin-Ying Lee, Hung-Yu Tseng, Jia-Bin Huang, Maneesh Singh, and Ming-Hsuan Yang. Diverse image-to-image translation via disentangled representations. In Proceedings of the European Conference on Computer Vision (ECCV), pp. 35-51, 2018.

(56) References Cited

OTHER PUBLICATIONS

Hongyu Liu, Bin Jiang, Yibing Song, Wei Huang, and Chao Yang. Rethinking image inpainting via a mutual encoder-decoder with feature equalizations. arXiv preprint arXiv:2007.06929, 2020.

Ming-Yu Liu, Thomas Breuel, and Jan Kautz. Unsupervised image-to-image translation networks. In Advances in neural information processing systems, pp. 700-708, 2017.

Xihui Liu, Zhe Lin, Jianming Zhang, Handong Zhao, Quan Tran, Xiaogang Wang, and Hongsheng Li. Open-edit: Open-domain image manipulation with open-vocabulary instructions. arXiv preprint arXiv:2008.01576, 2020.

David G Lowe. Object recognition from local scale-invariant features. In Proceedings of the seventh IEEE international conference on computer vision, vol. 2, pp. 1150-1157. Ieee, 1999.

Bruce D Lucas, Takeo Kanade, et al. An iterative image registration technique with an application to stereo vision. Vancouver, British Columbia, 1981.

Xudong Mao, Qing Li, Haoran Xie, Raymond YK Lau, Zhen Wang, and Stephen Paul Smolley. Least squares generative adversarial networks. In Proceedings of the IEEE International Conference on Computer Vision, pp. 2794-2802, 2017.

Roey Mechrez, Itamar Talmi, and Lihi Zelnik-Manor. The contextual loss for image transformation with non-aligned data. In Proceedings of the European Conference on Computer Vision (ECCV), pp. 768-783, 2018.

Kamyar Nazeri, Eric Ng, Tony Joseph, Faisal Z Qureshi, and Mehran Ebrahimi. Edgeconnect: Generative image inpainting with adversarial edge learning. arXiv preprint arXiv:1901.00212, 2019.

Evangelos Ntavelis, Andres Romero, Iason Kastanis, Luc Van Gool, and Radu Timofte. Sesame: Semantic editing of scenes by adding, manipulating or erasing objects. arXiv preprint arXiv:2004.04977, 2020.

Taesung Park, Ming-Yu Liu, Ting-Chun Wang, and Jun-Yan Zhu. Semantic image synthesis with spatially-adaptive normalization. In Proceedings of the IEEE Conference on Computer Vision and Pattern Recognition, 2019.

Yurui Ren, Xiaoming Yu, Junming Chen, Thomas H Li, and Ge Li. Deep image spatial transformation for person image generation. In Proceedings of the IEEE/CVF Conference on Computer Vision and Pattern Recognition, pp. 7690-7699, 2020.

Yurui Ren, Xiaoming Yu, Ruonan Zhang, Thomas H Li, Shan Liu, and Ge Li. Structureflow: Image inpainting via structure-aware appearance flow. In Proceedings of the IEEE International Conference on Computer Vision, pp. 181-190, 2019.

Tim Salimans, Ian Goodfellow, Wojciech Zaremba, Vicki Cheung, Alec Radford, and Xi Chen. Improved techniques for training gans. In Advances in neural information processing systems, pp. 2234-2242, 2016.

Assaf Shocher, Yossi Gandelsman, Inbar Mosseri, Michal Yarom, Michal Irani, William T Freeman, and Tali Dekel. Semantic pyramid for image generation. In Proceedings of the IEEE/CVF Conference on Computer Vision and Pattern Recognition, pp. 7457-7466, 2020.

Karen Simonyan and Andrew Zisserman. Very deep convolutional networks for large-scale image recognition. arXiv preprint arXiv:1409.1556, 2014.

Yuhang Song, Chao Yang, Yeji Shen, Peng Wang, Qin Huang, and C-C Jay Kuo. Spg-net: Segmentation prediction and guidance network for image inpainting. arXiv preprint arXiv:1805.03356, 2018.

Ashish Vaswani, Noam Shazeer, Niki Parmar, Jakob Uszkoreit, Llion Jones, Aidan N Gomez, Łukasz Kaiser, and Illia Polosukhin. Attention is all you need. In Advances in neural information processing systems, pp. 5998-6008, 2017.

Jingdong Wang, Ke Sun, Tianheng Cheng, Borui Jiang, Chaorui Deng, Yang Zhao, Dong Liu, Yadong Mu, Mingkui Tan, Xinggang Wang, et al. Deep high-resolution representation learning for visual recognition. IEEE transactions on pattern analysis and machine intelligence, 2020.

Miao Wang, Guo-Ye Yang, Ruilong Li, Run-Ze Liang, Song-Hai Zhang, Peter Hall, Shi-Min Hu, et al. Example-guided style consistent image synthesis from semantic labeling. arXiv preprint arXiv:1906.01314, 2019.

Ting-Chun Wang, Ming-Yu Liu, Jun-Yan Zhu, Andrew Tao, Jan Kautz, and Bryan Catanzaro. High-resolution image synthesis and semantic manipulation with conditional gans. In Proceedings of the IEEE conference on computer vision and pattern recognition, pp. 8798-8807, 2018.

Zhou Wang, Alan C Bovik, Hamid R Sheikh, Eero P Simoncelli, et al. Image quality assessment: from error visibility to structural similarity. IEEE transactions on image processing, 13(4):600-612, 2004.

Wei Xiong, Jiahui Yu, Zhe Lin, Jimei Yang, Xin Lu, Connelly Barnes, and Jiebo Luo. Foreground-aware image in-painting. In Proceedings of the IEEE conference on computer vision and pattern recognition, pp. 5840-5848, 2019.

Fisher Yu and Vladlen Koltun. Multi-scale context aggregation by dilated convolutions. arXiv preprint arXiv:1511.07122, 2015.

Jiahui Yu, Zhe Lin, Jimei Yang, Xiaohui Shen, Xin Lu, and Thomas S Huang. Generative image inpainting with contextual attention. In Proceedings of the IEEE conference on computer vision and pattern recognition, pp. 5505-5514, 2018.

Jiahui Yu, Zhe Lin, Jimei Yang, Xiaohui Shen, Xin Lu, and Thomas S Huang. Free-form image inpainting with gated convolution. In Proceedings of the IEEE International Conference on Computer Vision, pp. 4471-4480, 2019.

Kaiyu Yue, Ming Sun, Yuchen Yuan, Feng Zhou, Errui Ding, and Fuxin Xu. Compact generalized non-local network. In Advances in Neural Information Processing Systems, pp. 6510-6519, 2018.

Yu Zeng, Zhe Lin, Jimei Yang, Jianming Zhang, Eli Shechtman, and Huchuan Lu. High-resolution image inpainting with iterative confidence feedback and guided upsampling. arXiv preprint arXiv:2005.11742, 2020.

Han Zhang, Ian Goodfellow, Dimitris Metaxas, and Augustus Odena. Self-attention generative adversarial networks. arXiv preprint arXiv:1805.08318, 2018.

Pan Zhang, Bo Zhang, Dong Chen, Lu Yuan, and Fang Wen. Cross-domain correspondence learning for exemplar-based image translation. In Proceedings of the IEEE/CVF Conference on Computer Vision and Pattern Recognition, pp. 5143-5153, 2020.

Richard Zhang, Phillip Isola, Alexei A Efros, Eli Shechtman, and Oliver Wang. The unreasonable effectiveness of deep features as a perceptual metric. In Proceedings of the IEEE Conference on Computer Vision and Pattern Recognition, pp. 586-595, 2018.

Haitian Zheng, Haofu Liao, Lele Chen, Wei Xiong, Tianlang Chen, and Jiebo Luo. Example-guided scene image synthesis using masked spatial-channel attention and self-supervision; Nov. 27, 2019.

Bolei Zhou, Agata Lapedriza, Aditya Khosla, Aude Oliva, and Antonio Torralba. Places: A 10 million image database for scene recognition. IEEE Transactions on Pattern Analysis and Machine Intelligence, 2017.

Bolei Zhou, Hang Zhao, Xavier Puig, Sanja Fidler, Adela Barriuso, and Antonio Torralba. Scene parsing through ade20k dataset. In Proceedings of the IEEE conference on computer vision and pattern recognition, pp. 633-641, 2017.

Xingran Zhou, Bo Zhang, Ting Zhang, Pan Zhang, Jianmin Bao, Dong Chen, Zhongfei Zhang, and Fang Wen. Full-resolution correspondence learning for image translation. arXiv preprint arXiv:2012.02047, 2020.

Jun-Yan Zhu, Philipp Krahenbuhl, Eli Shechtman, and Alexei A Efros. Generative visual manipulation on the natural image manifold. In European conference on computer vision, pp. 597-613. Springer, 2016.

Jun-Yan Zhu, Taesung Park, Phillip Isola, and Alexei A Efros. Unpaired image-to-image translation using cycle-consistent adversarial networks. In Proceedings of the IEEE international conference on computer vision, pp. 2223-2232, 2017. Part 1.

Jun-Yan Zhu, Taesung Park, Phillip Isola, and Alexei A Efros. Unpaired image-to-image translation using cycle-consistent adversarial networks. In Proceedings of the IEEE international conference on computer vision, pp. 2223-2232, 2017. Part 2.

(56) References Cited

OTHER PUBLICATIONS

Xizhou Zhu, Han Hu, Stephen Lin, and Jifeng Dai. Deformable convnets v2: More deformable, better results. In Proceedings of the IEEE Conference on Computer Vision and Pattern Recognition, pp. 9308-9316, 2019.

Max Jaderberg, Karen Simonyan, Andrew Zisserman, et al. Spatial transformer networks. In Advances in neural information processing systems, pp. 2017-2025, 2015.

J. Dai et al., "Deformable Convolutional Networks," 2017 IEEE International Conference on Computer Vision (ICCV), 2017, pp. 764-773, doi: 10.1109/ICCV.2017.89.

U.S. Appl. No. 17/220,543, Aug. 26, 2022, Office Action.

U.S. Appl. No. 17/220,543, Dec. 8, 2022, Notice of Allowance.

\* cited by examiner

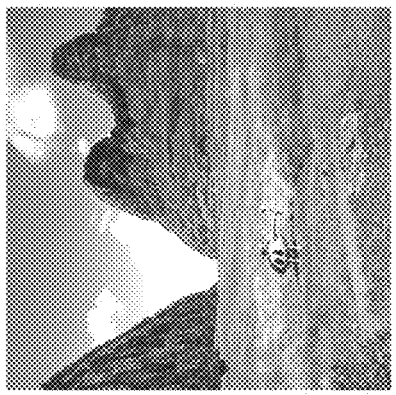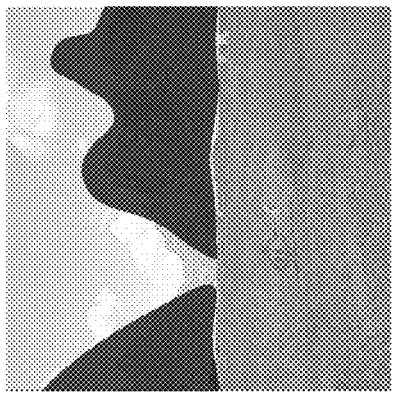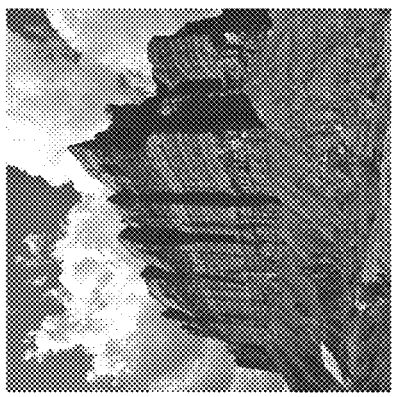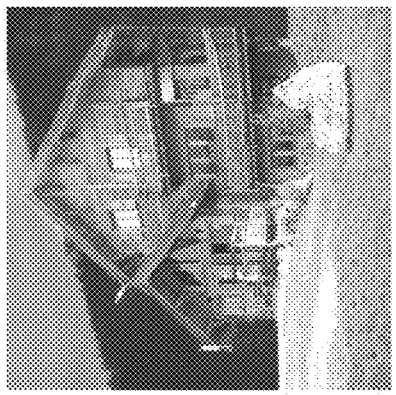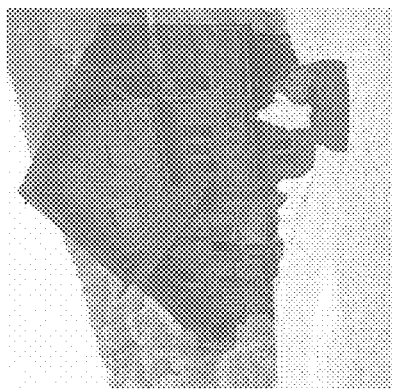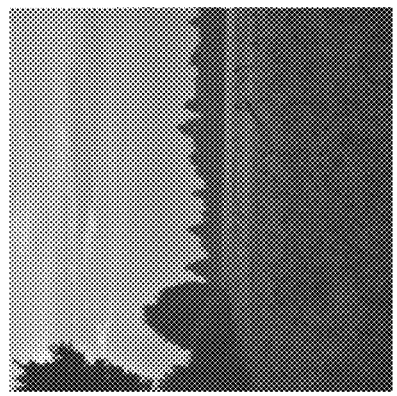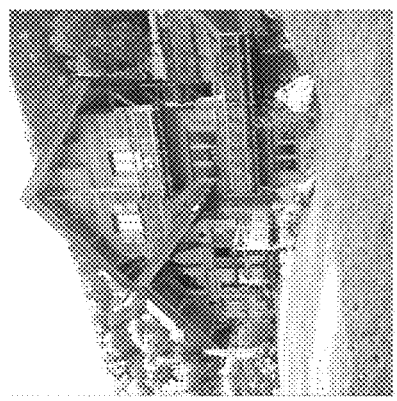
Fig. 8A
Fig. 8B

GENERATING DIGITAL IMAGES UTILIZING HIGH-RESOLUTION SPARSE ATTENTION AND SEMANTIC LAYOUT MANIPULATION NEURAL NETWORKS

CROSS-REFERENCE TO RELATED APPLICATIONS

The present application is a continuation of U.S. application Ser. No. 17/220,543, filed on Apr. 1, 2021. The aforementioned application is hereby incorporated by reference in its entirety.

BACKGROUND

Recent years have seen significant improvements in hardware and software platforms for training and utilizing machine-learning models. For instance, several machine-learning methods have achieved promising performance in areas such as image editing. Notwithstanding these improvements, conventional systems continue to suffer from several problems with regard to the accuracy, efficiency, and flexibility of computing device operations, and in particular, with respect to semantic image layout manipulation, which aims to manipulate an input image based on an edited semantic label map (i.e., an edited semantic layout). In particular, many conventional systems poorly transfer visual details from an input image, which results in unrealistic output images. Further, because many conventional systems employ approaches that require large computational costs, these conventional systems are limited to generating low-resolution images. These along with additional problems and issues exist in current systems that generate digital images based on semantic layout manipulation.

BRIEF SUMMARY

Implementations of the present disclosure provide benefits and/or solve one or more of the foregoing or other problems in the art with systems, non-transitory computer-readable media, and methods that accurately, flexibly, and efficiently generate and utilize a sparse attention warped image neural network and a digital image layout neural network to generate refined digital images based on edited semantic layouts. To illustrate, in various implementations, the disclosed systems build a sparse attention warped image neural network that utilizes sparse attention mapping to accurately and efficiently transfer visual details to new layouts at high-resolutions. For instance, the disclosed systems utilize the sparse attention warped image neural network to generate a warped digital image from an input image and an edited semantic layout. Additionally, in one or more implementations, the disclosed systems build a digital image layout neural network that utilizes a generator architecture having a semantic encoder and a two-stage decoder for coarse-to-fine image synthesis. Utilizing the digital image layout neural network, in various implementations, the disclosed systems generate a realistic refined digital image that matches the style and look of an input image while aligning and following the structure of the edited semantic layout.

The following description sets forth additional features and advantages of one or more implementations of the disclosed systems, computer-readable media, and methods.

BRIEF DESCRIPTION OF THE DRAWINGS

The detailed description provides one or more implementations with additional specificity and detail through the use of the accompanying drawings, as briefly described below.

FIGS. 8A-8C illustrate block diagrams of generating refined mixed images based on an input image, a reference image, and an edited semantic layout in accordance with one or more implementations.

DETAILED DESCRIPTION

Figure 1:
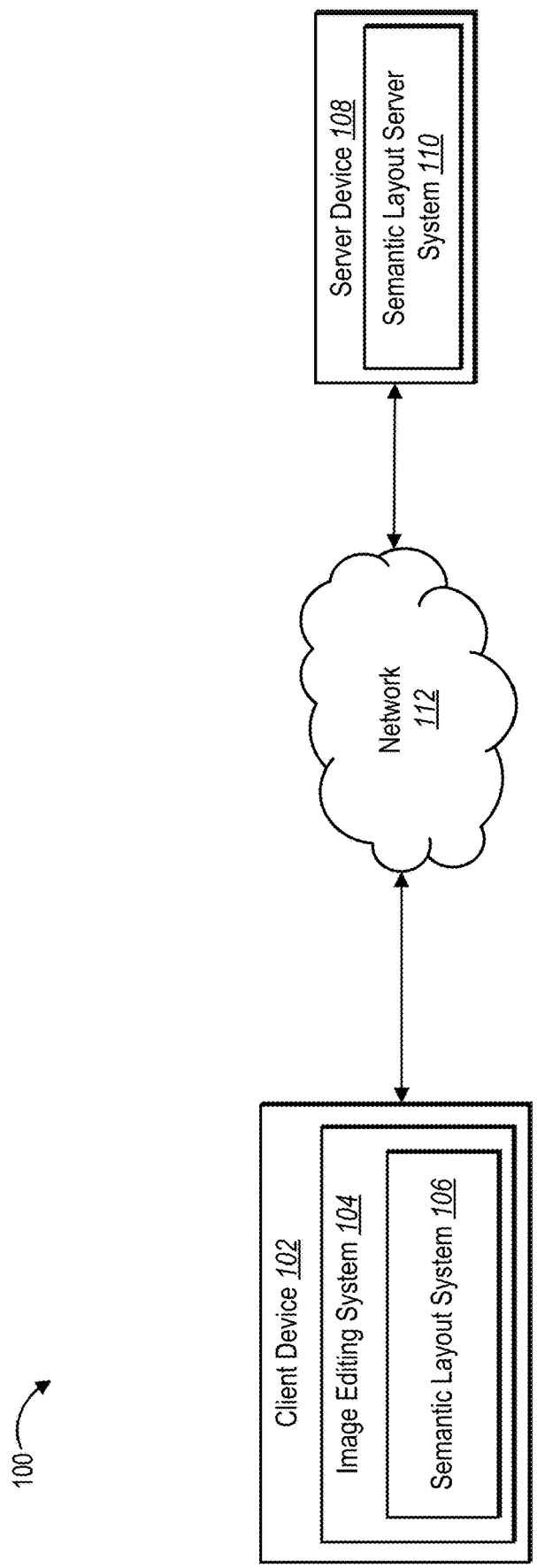
FIG. 1 illustrates a schematic diagram of a system environment in which a semantic layout system operates in accordance with one or more implementations.

This disclosure describes one or more implementations of a semantic layout system (e.g., a digital image semantic layout manipulation system) that generates refined digital images resembling the style of one or more input images while aligning to the structure of an edited semantic layout. For example, in various implementations, the semantic layout system builds and utilizes a sparse attention warped image neural network to generate a high-resolution warped image and a digital image layout neural network to enhance the warped image into a realistic and accurate refined digital image. To illustrate, in various implementations, the semantic layout system generates feature maps for an input image and an edited semantic layout corresponding to the input image. Additionally, the semantic layout system generates a sparse correspondence mapping by identifying a subset of features between the feature maps. Further, in one or more implementations, the semantic layout system generates a warped image from the edited semantic layout map and the sparse correspondence mapping. Then, utilizing encoders of the digital image layout neural network, the semantic layout system extracts warped image semantic features from the warped image and generates encoded features from the edited semantic layout and the warped image semantic features. Moreover, in some implementations, the semantic layout system generates the refined digital image utilizing one or more decoders (e.g., a set of coarse-to-fine decoders) of the digital image layout neural network.

As mentioned above, in various implementations, the semantic layout system utilizes a high-resolution sparse attention warped image neural network (or simply "sparse attention network") that generates a warped image based on a high-resolution sparse correspondence mapping. In various implementations, the semantic layout system receives an input image (i.e., a digital image) and a corresponding edited semantic layout (or simply an "edited layout"). For both the input image and the edited layout, the semantic layout system generates high-resolution feature maps that indicate feature classifications of the input image and the edited layout.

Additionally, in one or more implementations, the semantic layout system generates a high-resolution sparse correspondence mapping from the feature maps. For instance, the semantic layout system determines a sparse correspondence mapping between the feature map of the input image and the feature map of the edited layout by identifying a subset of features from the input image feature map corresponding to a given feature in the edited layout feature map. The semantic layout system can generate this sparse correspondence while maintaining a high resolution of 264×264, 512×512, or greater. In one or more implementations, the semantic layout system utilizes one or more patch matching algorithms to determine the subset of features for the given pixel.

Further, in one or more implementations, the semantic layout system generates a warped image from the feature subsets. For example, for each subset corresponding to a given pixel, in various implementations, the semantic layout system utilizes a deformable convolutional approach to generate a warped pixel value from the given pixel. In some implementations, the semantic layout system determines warped pixel values based on weighting correspondences according to feature distance. In example implementations, the semantic layout system also applies a masked image to generate a locally warped image that limits the warping to one or more particular areas.

As mentioned above, in various implementations, the semantic layout system utilizes a digital image layout neural network to generate a refined image based on an input image, an edited layout, and a warped image. As also mentioned above, different implementations of the digital image layout neural network include multiple combinations of encoders and/or decoders. To illustrate, in one or more implementations, the semantic layout system utilizes a visual-semantic embedding encoder to extract a warped image semantic feature set from the warped image. In some implementations, the semantic layout system utilizes one or more additional encoders (e.g., a dilated convolutional encoder and/or contextual attention encoder) to generate an encoded feature set from the warped image semantic feature set as well as a masked image and a layout embedding generated from the edited layout.

Additionally, in one or more implementations, the semantic layout system generates a refined image utilizing a coarse decoder and a fine decoder. For instance, the semantic layout system generates a first set of decoded features utilizing a coarse decoder based on the encoded feature set. Further, the semantic layout system generates the refine image utilizing a fine decoder from the first set of decoded features. In some implementations, the coarse decoder provides intermediate features from the coarse decoder to the fine decoder when generating the refined image.

In various implementations, the semantic layout system utilizes multiple loss functions to build and tune the digital image layout neural network. For example, in one or more implementations, the semantic layout system tunes the coarse decoder of the digital image layout neural network with comparative loss. In some implementations, the semantic layout system tunes the fine decoder utilizing a discriminator model and adversarial loss as part of a generative adversarial network architecture.

As mentioned above, in various implementations, the semantic layout system provides an edited semantic layout to the sparse attention network and/or the digital image layout neural network. In one or more implementations, the semantic layout system generates a semantic layout of a digital image utilizing a semantic feature extraction neural network to classify each pixel in the digital image with a semantic label. Additionally, the semantic layout is modified, for example, by a user within a semantic layout editor to generate an edited layout.

As also mentioned above, in some implementations, the semantic layout system generates a locally warped image. For example, in various implementations, the semantic layout system utilizes a mask image generated from comparing the semantic layout to an edited layout. Further, in various implementations, the semantic layout system applies the mask to the digital image to generates a masked image, which the semantic layout system can utilize to generate a locally warped image, as described below.

In some implementations, the semantic layout system generates a refined image from multiple input images. For example, multiple digital images (e.g., a digital image a digital asset reference image) are used to generate an edited layout that includes semantic labels from each image. In these implementations, the semantic layout system generates a warped image based on semantic portions from each of the input images. Further, the semantic layout system utilizes the digital image layout neural network to polish the warped image and generate an accurate and realistic refined image.

As mentioned above, conventional systems suffer from a number of problems with regard to the accuracy, efficiency, and flexibility of computing device operations. For example, regarding accuracy, many conventional systems produce inaccurate and unrealistic output images from edited layouts. In many instances, conventional systems produce poor and inaccurate output images because they often discard pixels that contain important visual details. Indeed, many existing attention-based systems struggle to capture and transfer high or even medium resolution visual details from an input image.

Additionally, many conventional systems struggle with accuracy as they modify images in undesirable ways. For example, several conventional systems do not overcome the challenges of predicting complex, non-rigid spatial deformations or the issues with domain gap disparities between an input image and an edited semantic layout. Indeed, many conventional systems lack accurate spatial alignment mechanisms needed to handle drastic layout changes, resulting in poor warped images as well as poor output images.

Further, various conventional systems produce inaccurate and unrealistic output images because they cannot maintain high-resolution samples throughout the process. Instead, they downgrade images and feature maps to low-resolutions, which results in the loss of important pixels and visual details. For example, in various instances, conventional systems perform image warping based on low-resolution pixels rather than features. As a result, these conventional systems often fail to preserve textures and patterns when generating warped images and/or output images.

As mentioned above, many conventional systems are also inefficient. In many instances, conventional systems require high computational costs to provide output images. For example, many conventional systems employ warping approaches that require O(4") operations, where n represents the number of pixels in an image. Thus, unless an image is downsampled to a lower resolution (e.g., 64×64), conventional systems are unable to generate a warped image. Indeed, many conventional systems are not unable to adapt to higher resolution processing due to the high computational cost while computing devices are limited in their current processing abilities and available resources. As a result, these high computational costs limit most conventional systems to low-resolution warping, which results in inefficiencies and inaccuracies, as described above. Alternatively, some conventional systems address small regions of an image independently to throttle computational costs. However, this bifurcated approach causes the loss of visual details in warped images as the piecemeal processing does not capture the image as a whole and results in output images that are fragmented and disjointed.

Moreover, as mentioned above, many conventional systems are also inflexible. For example, some conventional systems are rigidly simplistic and limited to employing patch-based copy-pasting strategies, which may work for stationary textures or repeating structures, but cannot generate new semantic structures realistically or accurately. Additionally, many conventional systems lack flexibility in that they are unable to harmonize the outputs with neighboring regions, lack spatial alignment, and discard pixels inside an image mask. Moreover, in many instances, the rigidness of conventional systems results in mishandling drastic layout changes due to spatial misalignments, warping low-resolution pixels instead of features, and losing texture and visual details from an input image, as described above.

In contrast, the semantic layout system can provide numerous advantages and benefits over conventional systems. As described below, in many implementations, the semantic layout system improves accuracy relative to conventional systems. For instance, the semantic layout system can generate realistic refined images that include high-resolution visual details and textures from one or more input images, but modified to fit the layout of an edited semantic layout. To illustrate, in many implementations, the semantic layout system builds and utilizes a sparse attention network i.e., a high-resolution sparse attention warped image neural network), which generates warped images that accurately transfer visual details from input images at high resolutions. Indeed, the sparse attention network can create a high-resolution sparse correspondence mapping (i.e., a sparse correspondence feature map) without downgrading input images or features to lower resolutions. By maintaining a high-resolution throughout the sparse attention network, the semantic layout system can generate a warped image that is highly detailed and accurate by identifying and utilizing essential texture and structure information from the entire input image including the editing regions.

Further, in many implementations, the semantic layout system improves accuracy by further polishing the high-resolution warped image utilizing a digital image layout neural network that often includes multiple encoders and a two-stage coarse-to-fine decoder (e.g., a coarse decode and a fine decoder). In various implementations, by utilizing the digital image layout neural network described herein, the semantic layout system takes advantage of both guided inpainting and global layout warping techniques to generate realistic images. Indeed, the semantic layout system can utilize a guided inpainting framework that allows the digital image layout neural network to draw upon contextual information needed to generate smooth and realistic refined images.

By way of empirical evidence, researchers have found that example implementations disclosed herein provide increased accuracy over conventional systems. Indeed, Tables 1-4 below provide qualitative results of example implementations of the semantic layout system outperforming conventional systems in terms of generating accurate warped images as well as refined images. Further, FIGS. 9A-9B, which are described below, show qualitative results and describe quantitative results of example implementations of the semantic layout system providing more accurate warped images and refined images than conventional systems.

In addition, the semantic layout system improves efficiency relative to conventional systems. For instance, the semantic layout system can work efficiently at higher resolutions. Thus, while conventional systems are constrained to low-resolution processing due to their high computational costs (e.g., O(4")), the semantic layout system can operate at a significantly lower cost (e.g., $O(n^2 \times C)$, where C is a relatively small number of subset samples). Indeed, the semantic layout system can efficiently compute dense correspondences at high-resolutions by sparsely sampling feature matches and iterative match propagation between features of an input image and an edited layout.

Further, in various implementations, the semantic layout system employs multiple tools that facilitate increased efficiency. For example, some of these tools include an up-sampling feature map layers, an efficient key index sampling algorithm that generates a subset of matching key features from the input image for each query feature from the edited layout, and a sparse attention warping layer that attentively combines the sparse keys to generate high-resolution warped output. Each of these tools is further described below.

Further, the semantic layout system can also improve flexibility relative to conventional systems. As mentioned above, the semantic layout system can flexibly work across various image resolutions, including high-resolution images of 264×264, 512×512, or higher. Additionally, in various implementations, the semantic layout system flexibly works with edited semantic layouts that are different from an input image. Further, unlike most conventional systems, the semantic layout system can generate refined images that flexibly harmonize neighboring regions within a refined image, spatially align different feature maps precisely and accurately, and preserve pixels and other important visual features.

As illustrated by the foregoing discussion, the present disclosure utilizes a variety of terms to describe the features and advantages of the semantic layout system. To illustrate, the term "digital image" (or simply "image") refers to a digital visual representation (e.g., a digital graphics file that when rendered displays one or more objects or scenes). In various implementations, images are made up of pixels of features that group together to form a visual representation. In various implementations, an image editing system displays an image on a computing device, such as a client device.

In one or more implementations, a digital image includes an input digital image (or simply "input image"), warped image, locally warped image, masked image, semantic layout (i.e., semantic image), edited semantic layout, coarse image, and refined image. As used herein, the term "warped image" refers to a digitally manipulated image. For instance, the semantic layout system generates a warped image by manipulating pixels on an input image in accordance with an edited layout (e.g., an edited semantic layout). In many implementations, the semantic layout system utilizes a high-resolution sparse attention warped image neural network to generate a warped image. In some instances, the term "locally warped image" refers to a warped image where only a portion of an input image (e.g., based on an image mask) is modified when generating the warped image.

The terms "mask" or "image mask," as used herein, refer to an indication of a plurality of pixels that separates an input image into two or more portions. For instance, a mask includes positive pixels (e.g., a binary value of 1) in areas where an image is to be kept and negative pixels (e.g., a binary value of 0) in areas where the image is to be discarded. Accordingly, the term "masked image," as used herein, refers to a mask applied to a digital image (e.g., an input image) that indicates the pixels of the digital image to keep and the pixels of the digital image to omit.

As used herein, the terms "semantic layout" or "semantic layout map" refers to an image that labels pixels of a digital image (e.g., an input image) with an object class or other image classification. For example, for a digital image having a person, a dog, and a background, the semantic layout of the image includes a first semantic group of pixels labeled as a person, a second semantic group of pixels labeled as a dog, and a third semantic group of pixels labeled as a background. In various implementations, a semantic layout indicates the different segmentation groups (e.g., object classes) via different colored areas overlayed on the digital image. The term "edited semantic layout" refers to an image where the semantic layout has been modified or changed. For example, a semantic layout editor allows a user to expand a semantic group, remove a semantic group, or combine semantic groups from different digital images into a single edited semantic layout, as shown below in connection with FIGS. 6A-6C.

The terms "refined image" or "revised digital image," as used herein, refer to a digital image that is a synthetically polished, enhanced, or refined version of another digital image. For example, in various implementations, the semantic layout system utilizes a digital image layout neural network to generate a refined image. Despite being synthetically generated, in many implementations, a refined image appears realistic. Indeed, in various implementations, a refined image is able to fool a well-trained discriminator neural network. Similarly, the term "coarse image" refers to a digital image synthetically generated image based on another digital image. Often, a coarse image is not as accurate or realistic as a refined image. In many implementations, a coarse image reflects intermediate enhancements to an input digital image (e.g., a warped image) before being further enhanced to become a refined image.

The terms "patch matching" and "patch matching algorithm," as used herein, refer to a model or algorithm that generates nearest neighbor fields and/or feature matching pairs for digital images or feature maps. For example, the patch match algorithm can include a variety of methods or techniques for determining offsets (e.g., translations, rotations, scaling, or other transformations) for pixels or features within a feature map (e.g., a high-resolution feature map) and selecting offsets to include within a nearest neighbor field for the feature map. Additionally, the patch match algorithm can include iterative acts of idealizing, propagation, and searching for feature matching pairs between feature maps. For example, additional details regarding an example patch match algorithm can be found in C. Barnes et al., "PatchMatch: A Randomized Correspondence Algorithm For Structural Image Editing," published in ACM Transactions on Graphics, Proc. SIGGRAPH) 28(3), 2009, which is hereby incorporated by reference in its entirety.

As used herein, the term "neural network" refers to a machine learning model that can be tuned (e.g., trained) based on inputs to approximate unknown functions. In particular, the term neural network can include a model of interconnected neurons (organized into layers) that communicate and learn to approximate complex functions and generate outputs based on a plurality of inputs provided to the model. For instance, the term neural network includes one or more machine learning algorithms. In particular, the term neural network can include deep convolutional or deconvolutional neural networks that include various blocks, layers, components, and/or elements. In addition, a neural network is an algorithm (or set of algorithms) that implements deep learning techniques that utilize a set of algorithms to model high-level abstractions in data.

Further, in various implementations, neural networks encode and/or decode data via one or more encoders and/or decoders to generate image features (e.g., image feature sets and/or feature maps) and/or digital images. For example, a neural network can include a convolutional neural network, recurrent neural network, graph neural network, or generative adversarial neural network. Similarly, examples of neural networks can also include, a sparse attention warped image neural network, a digital image layout neural network, a multi-scale feature classification neural network, a deformable convolution neural network, a dilated neural network, a contextual attention neural network, and a semantic feature extraction neural network.

The term "adversarial network," as used herein, refers to a neural network that includes a discriminator neural network (or simply "discriminator"). In various implementations, the discriminator is part of a generative adversarial network (GAN) and learns to distinguish synthesized images from real images. For example, the discriminator attempts to determine when a digital image generated from a generator neural network is either a synthetic image or a real image. In one or more implementations, the discriminator attempts to determine whether a refined image generated by the digital image layout neural network (e.g., a generator neural network) is real or synthetic while the digital image layout neural network attempts to generate a refined image that can fool a well-trained discriminator.

As used herein, the terms "loss function" or "loss model" refer to a function that indicates error amounts (e.g., measures of loss). As mentioned above, in some embodiments, a machine-learning algorithm repetitively trains to minimize overall loss (and maximize loss in some cases). In some embodiments, the semantic layout system employs multiple loss functions and minimizes overall loss between multiple networks and models. Examples of loss functions include pixel loss, perceptual loss, adversarial loss (e.g., discriminator loss), feature matching loss, domain alignment loss, contextual loss, and correspondence distillation loss.

Additional detail regarding the semantic layout system will now be provided with reference to the figures. For example, FIG. 1 illustrates a schematic diagram of a digital medium system environment 100 in which a semantic layout system 106 operates in accordance with one or more implementations. As shown in FIG. 1, the digital medium system environment 100 ("environment 100") includes a client device 102, and a server device 108 connected via a network 112. Additional detail regarding these computing devices is provided below in connection with FIG. 12. In addition, FIG. 12 also provides additional detail regarding networks, such as the illustrated network 112.

As shown, the environment 100 includes the client device 102. In various implementations, the client device 102 is associated with a user (e.g., a user client device), such as a user that provides edits to a semantic layout and requests the semantic layout system to generate a refined image in accordance with the edited semantic layout. The client device 102 includes an image editing system 104 and a semantic layout system 106 (i.e., a digital image semantic layout manipulation system). In various implementations, the image editing system 104 implements the semantic layout system 106. In alternative implementations, the semantic layout system 106 is separate from the image editing system 104. While the image editing system 104 and the semantic layout system 106 are shown on the client device 102, in some implementations, the image editing system 104 and the semantic layout system 106 are located remotely from the client device 102 (e.g., on the server device 108), as further explained below.

The image editing system 104, in general, facilitates the creation, modification, sharing, and/or deletion of digital images. For instance, the image editing system 104 provides a variety of tools related to image creation and editing (e.g., photo-editing). For example, the image editing system 104 provides selection tools and image manipulation tools. Moreover, the image editing system 104 optionally operates in connection with one or more applications to generate or modify digital images including edited semantic layout images, warped images, and refined images. In some instances, the image editing system 104 operates in connection with digital design applications or other image editing applications.

As mentioned above, the image editing system 104 includes the semantic layout system 106. As further provided below, the semantic layout system 106 utilizes machine-learning models to generate refined images from input images and edited semantic layouts. In particular, the semantic layout system utilizes a semantic layout manipulation neural network to generate refined images. For example, in various implementations, the semantic layout manipulation neural network includes a sparse attention network (i.e., a high-resolution sparse attention warped image neural network) to generate warped images (e.g., locally warped images) and a digital image layout neural network having a coarse-to-fine decoder architecture to generate refined images from the warped images.

As shown, the environment 100 also includes the server device 108. The server device 108 includes a semantic layout server system 110. For example, in one or more implementations, the semantic layout server system 110 represents and/or provides similar functionality as described herein in connection with the semantic layout system 106. In some implementations, the semantic layout server system 110 supports the semantic layout system 106 on the client device 102. Indeed, in one or more implementations, the server device 108 includes all, or a portion of, the semantic layout system 106. For instance, the semantic layout server system 110 learns parameters for the semantic layout manipulation neural network and/or portions thereof. The semantic layout server system 110 then provides the semantic layout manipulation neural network with the learned parameters to the client device 102 (e.g., as part of an image editing application). In these instances, the client device 102 (e.g., the semantic layout system 106) can download the semantic layout manipulation neural network with the learned parameters from the server device(s) 108 (e.g., the semantic layout server system 110).

In some implementations, the semantic layout server system 110 includes a web hosting application that allows the client device 102 to interact with content and services hosted on the server device 108. To illustrate, in one or more implementations, the client device 102 accesses a web page supported by the server device 108. For example, the client device 102 provides one or more input images and an edited semantic layout to the server device 108, and, in response, the semantic layout server system 110 on the server device 108 generates a refined image that matches the style of the one or more input images while also following the structure of the edited semantic layout. The server device 108 then provides the refined image to the client device 102 for display.

Although FIG. 1 illustrates a particular number, type, and arrangement of components within the environment 100, various additional environment configurations and arrangements are possible. For example, the environment 100 includes any number of client devices. As another example, the server device 108 represents a set of connected server devices. As a further example, the client device 102 may communicate directly with the server device 108, bypassing the network 112 or utilizing a separate and/or an additional network.

Figure 2:
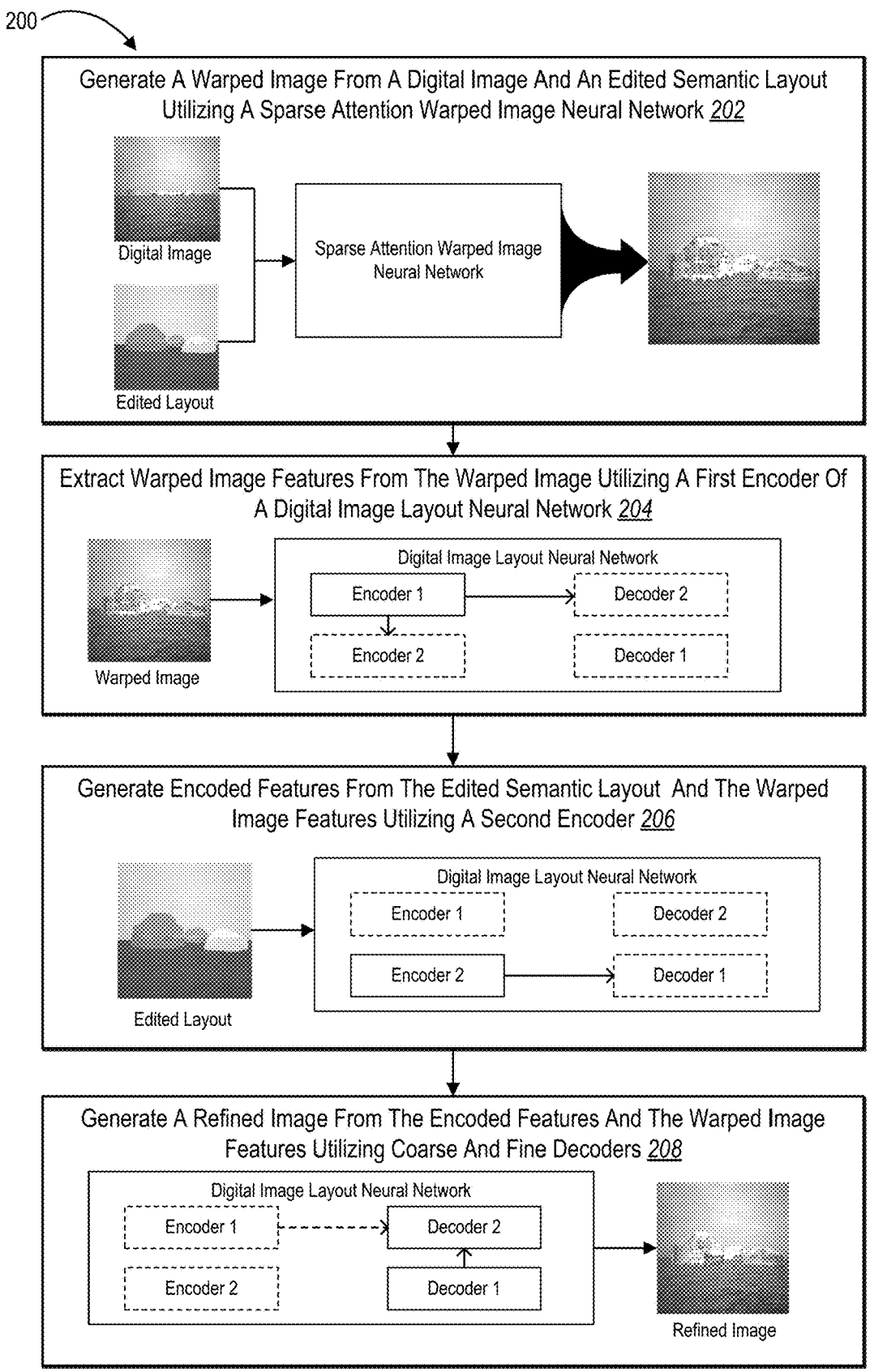
FIG. 2 illustrates an overview flow diagram of generating a refined digital image utilizing a sparse attention warped image neural network and a digital image layout neural network in accordance with one or more implementations.

As indicated above, FIG. 2 illustrates an overview diagram of generating a refined digital image utilizing a sparse attention warped image neural network and a digital image layout neural network in accordance with one or more implementations. In particular, FIG. 2 includes a series of acts 200 performed by the semantic layout system 106 of utilizing a sparse attention network (i.e., a high-resolution sparse attention warped image neural network) and a digital image layout neural network to generate a refined image.

As shown, FIG. 2 includes the semantic layout system performing an act 202 of generating a warped image from a digital image and an edited semantic layout utilizing a sparse attention warped image neural network. For example, in various implementations, the semantic layout system receives and/or identifies one or more input images, such as a digital image, and an edited semantic layout corresponding to the digital image. Then, utilizing a sparse attention network, in some implementations, the semantic layout system generates a warped image. In various implementations, the semantic layout system utilizes patch matching algorithms to generate a high-resolution sparse correspondence mapping, which is used to generate more accurate warped images. Additional detail regarding the sparse attention network and generating warped images is provided below with respect to FIGS. 4A-4B.

As shown in FIG. 2, the semantic layout system 106 also performs an act 204 of extracting warped image features from the warped image utilizing a first encoder of a digital image layout neural network. For example, in various implementations, the semantic layout system encodes image features from the warped image into visual embedding utilizing an encoder, such as a visual-semantic embedding encoder. Additional detail regarding extracting warped image features within the digital image layout neural network is provided below with respect to FIG. 5.

As illustrated in FIG. 2, the semantic layout system 106 also performs an act 206 of generating encoded features from the edited semantic layout and the warped image features utilizing a second encoder of the digital image layout neural network. For example, in various implementations, the semantic layout system further encodes the visual embedding of the warped image along with data from the edited semantic layout to generate encoded semantic features. In some instances, the data from the edited semantic layout includes layout embeddings and a masked image generated from the edited semantic layout. Additionally, in one or more implementations, the semantic layout system utilizes a dilated convolutional encoder and/or contextual attention encoder to generate the encoded semantic features (e.g., an encoded feature set). Additional detail regarding generating the encoded semantic features within the digital image layout neural network is provided below with respect to FIG. 5.

As shown in FIG. 2, the semantic layout system 106 also performs an act 208 of generating a refined image from the encoded features and the warped image utilizing coarse and fine decoders. For example, in various implementations, the semantic layout system first processes the encoded semantic features utilizing a coarse decoder (e.g., shown as Decoder 1) to generate a first set of decoded features from the encoded features. The semantic layout system then utilizes a fine decoder (e.g., shown as Decoder 2) to generate the refined image from the first set of decoded features and the warped image features. Additional detail regarding the coarse and fine decoders within the digital image layout neural network is provided below with respect to FIG. 5.

Figure 3:
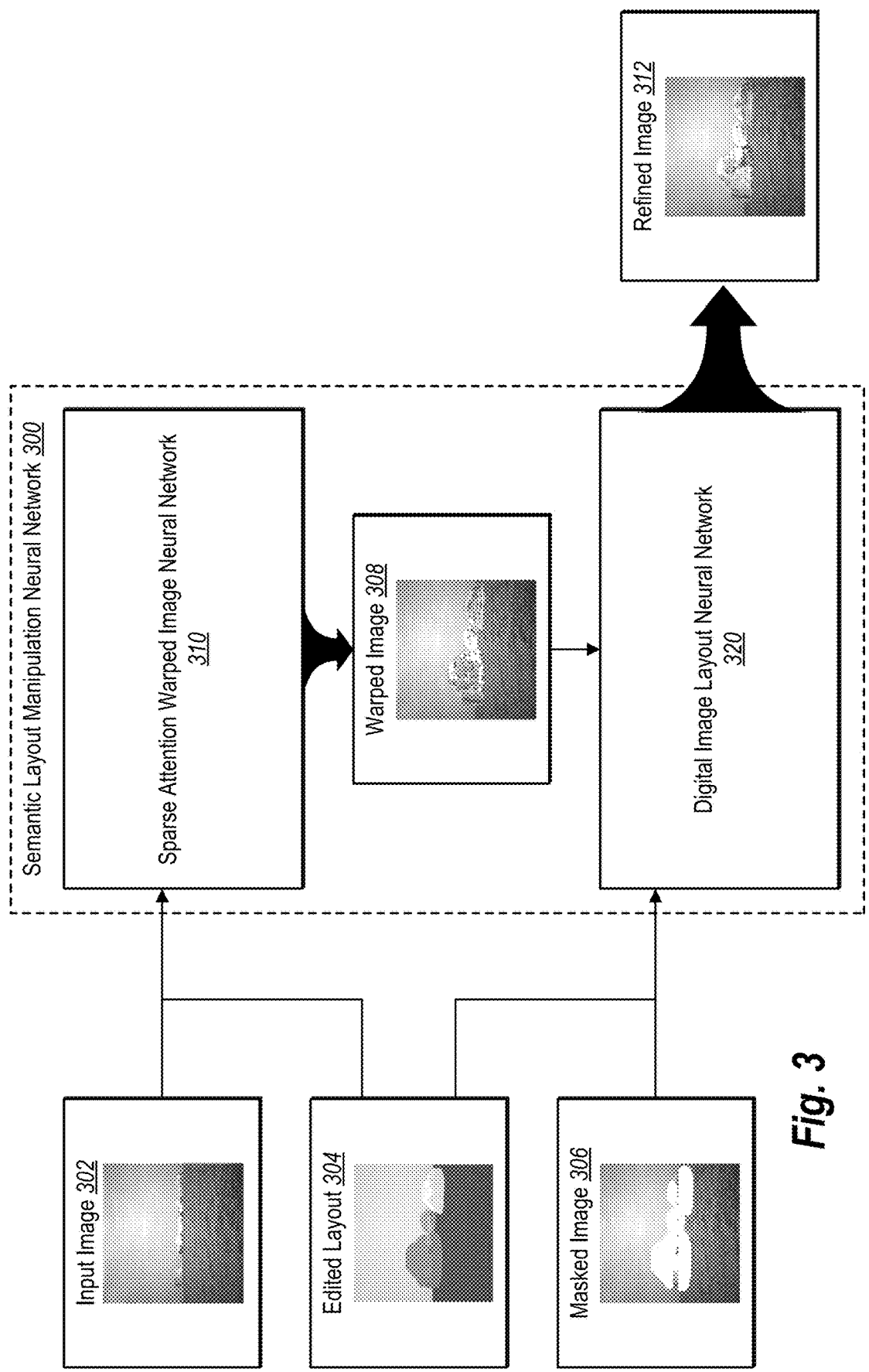
FIG. 3 illustrates a block diagram of generating a refined digital image utilizing a semantic layout manipulation neural network in accordance with one or more implementations.

Turning to the next figure, FIG. 3 provides an overview diagram of a semantic layout manipulation neural network that includes a sparse attention warped image neural network and a digital image layout neural network. In particular, FIG. 3 illustrates a block diagram of generating a refined digital image utilizing a sparse attention network and a digital image layout neural network in accordance with one or more implementations.

As shown, FIG. 3 includes digital images such as an input image 302, an edited layout 304, and a masked image 306 as well as a refined image 312. In various implementations, the edited layout 304 (i.e., an edited semantic layout map) and the masked image 306 are created based on the input image 302. Additional description regarding generating edited layouts 304 is provided below with respect to FIGS. 6A-6C. Further, additional description regarding generating masked images 306 is provided below with respect to FIGS. 7A-7B.

FIG. 3 also shows a semantic layout manipulation neural network 300. The semantic layout manipulation neural network 300 includes a sparse attention warped image neural network 310 (or simply a "sparse attention network 310") and a digital image layout neural network 320. As shown, the sparse attention network 310 generates a warped image 308 from the input image 302 and the edited layout 304. As mentioned previously, additional detail regarding the sparse attention network and generating warped images is provided below with respect to FIGS. 4A-4B.

As also shown, the digital image layout neural network 320 generates the refined image 312 from the warped image 308, the edited layout 304, and the masked image 306. In various implementations, the digital image layout neural network 320 includes multiple encoders and/or decoders to generate accurate and realistic refined images that match the style of the input image 302 while adhering to the arrangement and structure provided by the edited layout 304. As mentioned above, additional detail regarding the digital image layout neural network 302 is provided below in connection with FIG. 5.

Figure 4A:
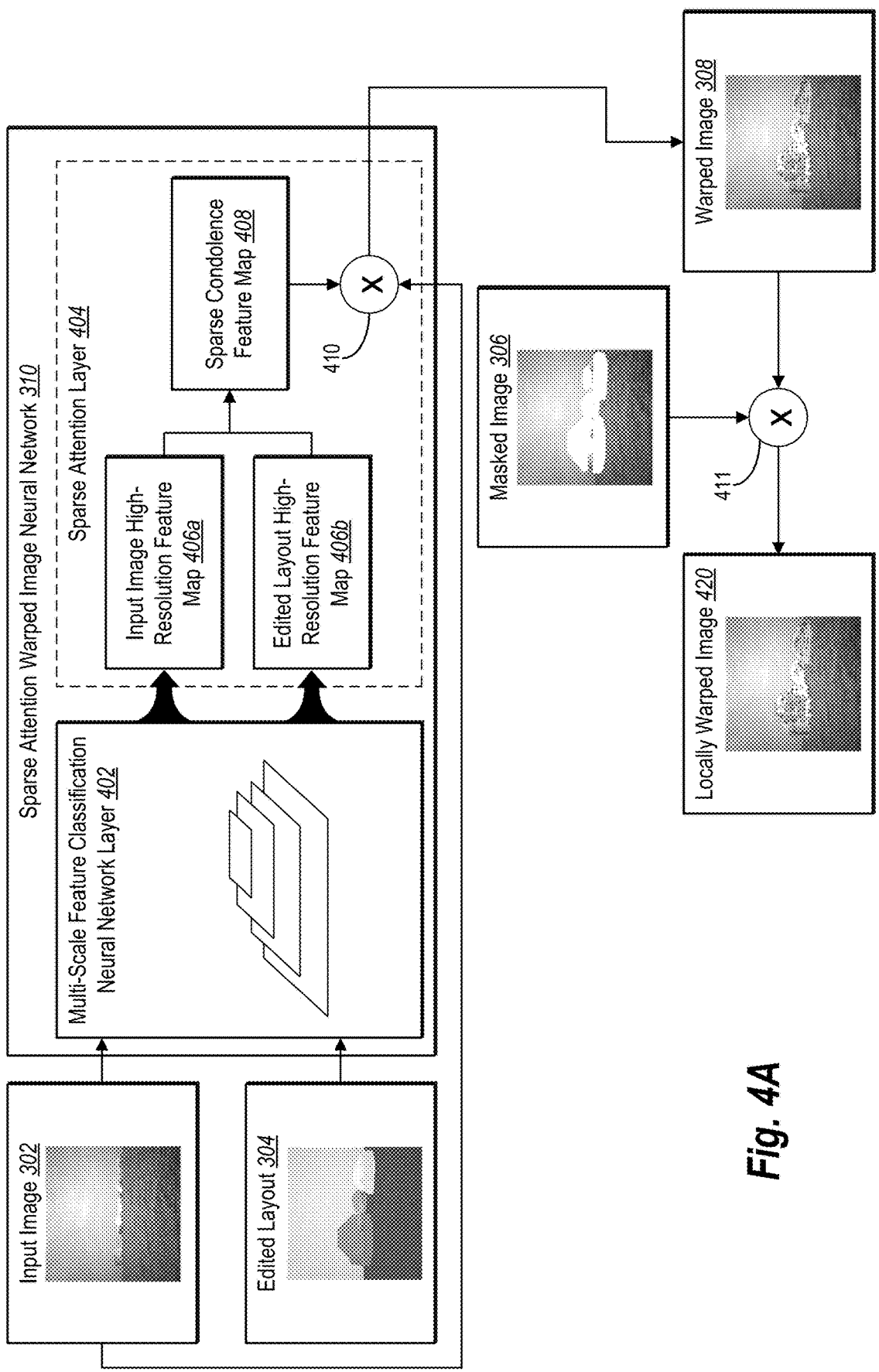
FIGS. 4A-4B illustrate block diagrams of a sparse attention warped image neural network in accordance with one or more implementations.
Figure 4B:
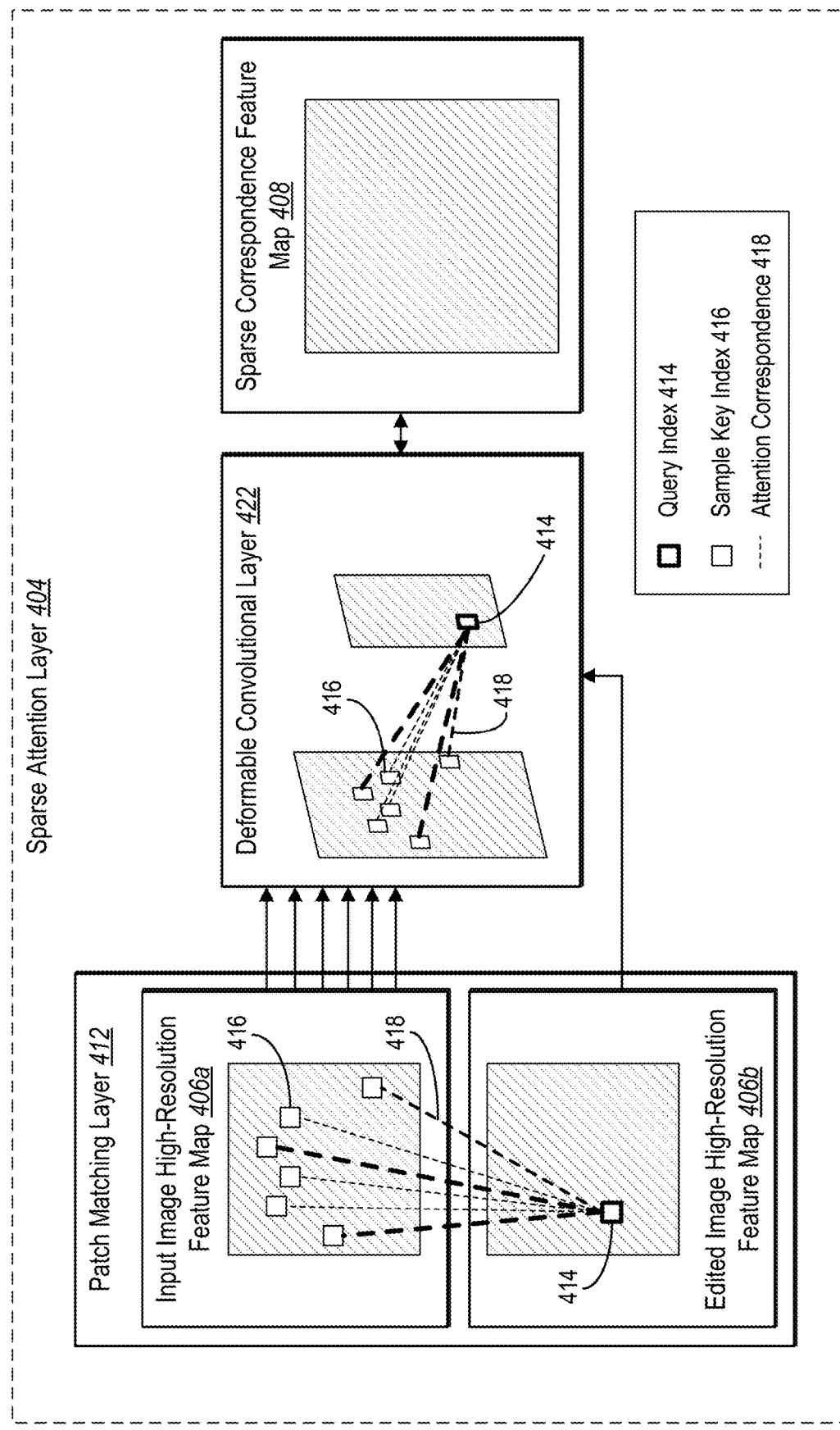

As mentioned above, FIGS. 4A-4B provides detail regarding the sparse attention network and generating warped images. In particular, FIGS. 4A-4B illustrate block diagrams of a sparse attention warped image neural network in accordance with one or more implementations. As shown, FIG. 4A includes the input image 302, the edited layout 304 (i.e., edited semantic layout map), a sparse attention warped image neural network 310 (or simply "sparse attention network 310"), a masked image 306, a warped image 308, and a locally warped image 420. In various implementations, the input image 302 and the edited layout 304 are high-resolution images (e.g., 512×512 resolution or above).

As described below, the semantic layout system builds and utilizes the sparse attention network 310 to transfer high-resolution visual details from the input image 302 to a sparse correspondence feature map. Further, the semantic layout system 106 utilizes attention-based warping to generate the warped image 308 from the sparse correspondence feature map. To illustrate, FIG. 4A shows the sparse attention network 310 including a multi-scale feature classification layer 402 and a sparse attention layer 404. In one or more implementations, the multi-scale feature classification layer 402 generates high-resolution feature maps by extracting image features from digital images. In various implementations, the multi-scale feature classification layer 402 processes the input image 302 and the edited layout 304 (i.e., the edited semantic layout map) separately and/or via separate multi-scale feature classification neural networks.

In some implementations, the multi-scale feature classification layer 402 utilizes a pyramid machine-learning model or neural network to extract multi-scale deep features by leveraging both local and global image contexts. Further, in one or more implementations, the multi-scale feature classification layer 402 aligns the domain of the input image 302 and with the domain of the edited layout 304. Indeed, to determine correspondences between the edited layout 304 and the input image 302, in a number of implementations, the semantic layout system aligns the domains to a common or shared domain.

To illustrate, in various implementations, the semantic layout system utilizes the multi-scale feature classification layer 402 to transform the input image 302 (represented as $x \in \mathbb{R}^{H \times W \times 3}$) and the edited layout 304 (represented as $c \in \mathbb{R}^{H \times W \times C}$ where c indicates semantic classes) to a shared domain (represented with spatial resolution H'×W' where H'=H/4 and W'=W/4). In particular, in some implementations, the semantic layout system aligns the input image 302 and the edited layout 304 to the shared domain utilizing the feature extractors $F_x(\cdot)$ and $F_c(\cdot)$, as shown in Equation 1 below.

$$f_x = F_x(x; \theta_{F,x})$$

$$f_c = F_c(c; \theta_{F,c}) \quad (1)$$

In Equation 1, θ can represent learnable parameters, and the representations $f_x$ and $f_c$ can include discriminative features that characterize the semantic inputs. Further, in various implementations, $f_x$ can represent an input image feature map and $f_c$ can represent an edited layout feature map. In some implementations, these feature maps are low-resolution feature maps that have resolutions below those of the inputs (e.g., the input image 302 and the edited layout 304).

As mentioned above, the multi-scale feature classification layer 402 generates high-resolution feature maps. Accordingly, in one or more implementations, the semantic layout system utilizes a feature map upsampling to upsample the feature maps to a high-resolution (e.g., at least a 512×512 resolution). In this manner, the semantic layout can facilitate a visual transfer that preserves details and features from the inputs.

To illustrate, in one or more implementations, the multi-scale feature classification layer 402 generates high-resolution feature maps. For example, $F_x^h$ can represent the input image high-resolution feature map 406a and $F_c^h$ can represent an edited layout high-resolution feature map 406b, each having the resolution of H×W such that spatial details for transfer are richly captured. In particular, in some implementations, the semantic layout system 106 converts the low-resolution feature maps (e.g., $f_x$ and $f_c$) to the high-resolution feature maps (e.g., $F_x^h$ and $F_c^h$) by utilizing spatially adaptive normalization to upsample the feature sizes of the low-resolution feature maps until the high-resolution (e.g., H×W) is achieved. Equation 2 provides an example formulation for the semantic layout system 106 performing feature map upsampling.

$$f_x^h = F'_x(f_x c; \theta_{F_x h})$$

$$f_c^h = F'_c(f_c x; \theta_{F_c h}) \quad (2)$$

In Equation 2, $F'_x$ and $F'c$ can represent feature up-samplers parameterized by $\theta_{F_x}^h$ and $\theta_{F_c h}$, respectively. In addition, in various implementations, the semantic layout system 106 utilizes the multi-scale feature classification layer 402 to perform channel-wise normalization at the end of $F_x^h$ and $F_c^h$, such that the output features at each location are normalized to have a zero mean and a unit $\ell_1$ norm.

As shown in FIG. 4A, the sparse attention network 310 includes the sparse attention layer 404. As shown, the sparse attention layer 404 includes the input image high-resolution feature map 406a and the edited layout high-resolution feature map 406b generated by the multi-scale feature classification layer 402. In addition, the sparse attention layer 404 includes the sparse correspondence feature map 408. In general, the sparse correspondence feature map 408 is a sparse correspondence mapping that relates the features from the input image 302 (e.g., the input image high-resolution feature map 406a) to the edited layout 304 (e.g., the edited layout high-resolution feature map 406b).

In addition, the semantic layout system 106 can utilize the sparse attention network 310 to generate the warped image 308. For example, in various implementations, the sparse attention network 310 applies the sparse correspondence feature map 408 to the input image 302 to generate the warped image 308 (shown at combiner 410). In some implementations, the sparse attention layer 404 utilizes a deformable convolution operation to generate the warped image 308. Additional detail regarding the sparse attention layer 404, the sparse correspondence feature map 408, and generating the warped image 420 is provided below with respect to FIG. 4B.

As mentioned above, FIG. 4A shows the semantic layout system 106 generating a locally warped image 420. For instance, in various implementations, the semantic layout system 106 applies (e.g., at the combiner 411) the warped image 308 with the masked image 306. In this manner, the semantic layout system 106 can locally align the high-resolution warped imaged with the edited layout 304 and accurately transfer visual details from the input image 302 to smoothly handle drastic layout changes in the edited layout 304.

To illustrate, in one or more implementations, the semantic layout system 106 spatially aligns features of the input image 302 with those of the edited layout 304, as described above, to generate a layout-aligned image (e.g., the warped image 308). The semantic layout system 106 next replaces the pixels of the warped image 308 outside of the mask with real pixels from the input image 302 to generate a locally aligned image (e.g., the locally warped image 420), as shown in Equation 3 below.

$$x_{warp} = r \odot m + x \odot (1-m) \quad (3)$$

As shown, in Equation 3, $x_{warp}$ may represent the locally warped image 420, r may represent the warped image 308, and m may represent an image mask. Indeed, in various implementations, the combiner 411 implements Equation 3 to generate the locally warped image 420 by blending the warped image 308 with the image mask.

As mentioned above, FIG. 4B provides additional detail regarding the sparse attention layer 404, the sparse correspondence feature map 408, and generating the warped image 420. As shown, the sparse attention layer 404 includes a patch matching layer 412 having the input image high-resolution feature map 406a (or simply "image feature map 406a") and the edited layout high-resolution feature map 406b (or simply "layout feature map 406b"), a deformable convolutional layer 422 and the sparse correspondence feature map 408 (e.g., a sparse correspondence mapping).

In various implementations, the semantic layout system 106 utilizes the patch matching layer 412 to determine a sparse attention feature correspondence between the image feature map 406a and the layout feature map 406b. As shown, for each query index 414 (e.g., a query feature) feature in the layout feature map 406b, the semantic layout system 106 determines a set of sample key index 416 features from the image feature map 406a. As also shown, each query index-sample key index pair is represented by an attention correspondence 418, where a thicker dashed line represents a stronger, more influential, attention correspondence 418. Further, in several implementations, the feature set of sample keys make up a subset (e.g., less than all) of the features of the image feature map 406a. Thus, rather than sampling every pixel or feature from the image feature map 406a, the semantic layout system 106 samples a subset of 20-30 sample leys (or another number of features).

Indeed, in most instances, only a small proportion of matched key-value pairs contribute to generating the warped image 308. Accordingly, in various implementations, the semantic layout system 106 prunes the search space of sample keys in an attention step. For example, for each query feature p, the semantic layout system 106 constrains the search space of key q to be in a sparse set where $\mathbb{C}_p$ where $|\mathbb{C}_p| \ll HW$. In this manner, the semantic layout system 106 can significantly reduce the computational processing needed to map features from an input image to an edited semantic layout.

In one or more implementations, the semantic layout system 106 generates the sparse point set $\mathbb{C}_p$ utilizing a key index sampling step, which may result in a sparse correspondence feature map 408 that efficiently aggregates pixels on irregular grids. For example, in various implementations, the semantic layout system 106 utilizes a key index sampling approach that follows a randomized correspondence Patch Matching algorithm.

To illustrate, in one or more implementations, for a first query feature (e.g., key index 416) in the layout feature map 406b, the semantic layout system 106 first identifies a first set of unmatched features of sample key features (e.g., sample key indexes 416) in the image feature map 406a. The semantic layout system 106 then may determine which of the sample key indexes 416 have a favorable feature matching score (e.g., satisfying a feature matching threshold value) with the first query features and add these to the sparse set $\mathbb{C}_p$ (associated with the first query feature). Indeed, in various implementations, the semantic layout system 106 utilizes a patch matching algorithm that performs initialization, propagation, and searching to identify corresponding portions (e.g., sample key indexes 416) of the feature maps that are similar to given pixels (e.g., query indexes 414). In some implementations, the semantic layout system 106 may also identify randomly selected features from the image feature map 406a. Accordingly, in this manner, the semantic layout system 106 propagates the building of the sparse point set $\mathbb{C}_p$ by focusing on areas of matching sample key features (e.g., non-randomly selected features) within the image feature map 406a for one or more adjacent query features in the layout feature map 406b.

In one or more implementations, the patch matching layer 412 facilitates the semantic layout system 106 determining an initial set of matching sample key features for a given query feature based on low-resolution feature maps, then up-sampling to the high-resolution feature maps and using the initial set of matching sample key features to determine the subset of sample key features. In some implementations, when evaluating potential feature pairs based on low-resolution feature maps, the semantic layout system 106 evaluates each feature or pixel on the image feature map 406a for each pixel or feature (e.g., query index 414) of the layout feature map 406b to determine pairs having favorable feature matching scores. Then, upon up-sampling to the high-resolution feature maps, the semantic layout system 106 only propagates pairs between a query feature and sample key features having the favorable feature matching scores.

As another level of detail, in one or more implementations, the semantic layout system 106 exploits the spatial coherency of feature maps to efficiently search for the best matching keys q for each query p, which makes up the sparse point set $\mathbb{C}_p$. For example, in various implementations, the semantic layout system 106 takes the cross-domain features $f_x^h$ and $f_c^h$ and randomly initializes particles t(p).

Further, in some implementations, the semantic layout system 106 repeats the following actions. First, the semantic layout system 106 performs particle sampling, where, for each query p, the semantic layout system 106 randomly generates k additional particles in a predefined search space near t(p). Second, the semantic layout system 106 performs propagation, where the particles from the adjacent pixels (or features) to query p are propagated to the query p. Third, the semantic layout system 106 evaluates the particles by selecting the top-M matching particles t(p) and evaluating the feature matching score $s_{p,t(p)}$ between p and t(p).

In various implementations, the semantic layout system 106 follows the above actions to iteratively generate matched particles from a random initialization (i.e., unmatched particles), which are added to the sparse point set $\mathbb{C}_p$ at each iteration. In various implementations, the semantic layout system 106 adds the best matched particles to random particles to the index set to facilitate the training of attention (e.g., where the sparse attention network 310 learns to select feature pairs of matching particles having favorable feature matching scores while ignoring feature pairs of random particles have low or insignificant feature matching scores). Accordingly, in these implementations, the semantic layout system 106 may also record the matching scores of each particle to facilitate further computation. As an example, Algorithm 1 below shows details of one or more implementations of the semantic layout system 106 performing key index sampling.

---

Algorithm 1: Key Index Sampling

Input: $f_x^h$ and $f_c^h$: the H × W × C feature map
Input: N: the number of iterations
Input: M: the number of particles
Output: C: the NM × H × W × 2 key index sets
/★ Randomly initialize M particles t of size M × H × W × 2 ★/
C ← ∅; $t_x$~U(0, W); $t_y$~U(0, H)
/★ store to outputs ★/
C ← insert(C, z)
for i = 1 ... N − 1 do
  | /★ propagation by convolution ★/
  | t ← t ⊙ $k_h$ //horizontal propagation
  | t ← t ⊙ $k_v$ //vertical propagation
  | /★ Evaluate top-M match ★/
  | t ← evaluation(q, $f_x^h$, $f_c^h$, M)
  | /★ store to outputs ★/
  | C ← insert(C, t)
  | /★ Particle Sampling ★/
  | $\Delta t_x$~U(0, W); $\Delta t_y$~U(0, H)
  | $t_x$ ← insert($t_x$, $\Delta t_x$); $t_y$ ← insert($t_y$, $\Delta t_y$)
end

---

In various implementations, the semantic layout system 106 convolves particle indices with predefined kernels to implement the particle propagation step. More specifically, with respect to the propagation step in Algorithm 1, in various implementations, the semantic layout system 106 takes the particle coordinate map t as input and aims to propagated particles to query p from adjacent pixels of sample key p. In various implementations, this type of propagation step offsets the particle coordinates map to four directions (e.g. top, down, left and right) by 1-pixel and can be efficiently implemented by convolving the particle coordinates map with a predefined one-hot filter pattern. In some implementations, to propagate particles from 8-adjacent neighbors, the semantic layout system 106 first applies propagation horizontally then applies propagation vertically.

Regarding the evaluation step in Algorithm 1, in one or more implementations, the semantic layout system 106 utilizes the function evaluation (t, $f_x^h$, $f_c^h$, M), which aims to select the top-M matching particles from t(p) at location p using the reference and content feature $f_x^h$ and $f_c^h$. In some implementations, the semantic layout system 106 applies bilinear sampling to warp the reference features $f_c^h$ to a location defined by particle coordinate t. Additionally, in various implementations, the semantic layout system 106 determines the feature matching score between the warped feature and the content features and selects the top-M particles accordingly. In some implementations, the semantic layout system 106 determines a feature matching score based on measuring a distance between a feature pair in multi-dimensional semantic vector space. Moreover, in one or more implementations, the semantic layout system 106 implements the evaluation step with build-in array indexing and/or a feature matching operation.

As described above, in various implementations, the semantic layout system 106 determines a subset for each feature of the layout feature map 406b. Thus, rather than mapping each pixel in the layout feature map 406b to every pixel of the image feature map 406a, which would be computationally infeasible at high-resolutions (e.g., at 264× 264 and above), the semantic layout system 106 maps each feature in the layout feature map 406b to a small subset of sample key features that have favorable feature matching scores. In this manner, the semantic layout system 106 can facilitate a detail-preserving visual transfer to generate high-resolution sparse correspondence feature maps 408 while still maintaining low computational costs.

In alternative implementations, the semantic layout system 106 determines a subset of corresponding features from the image feature map 406a for less than all of the features of the layout feature map 406b. For example, in some implementations, the semantic layout system 106 utilizes a mask to determine which pixels and/or features of the layout feature map 406b to build into the sparse point set $\mathbb{C}_p$, (e.g., the sparse correspondence feature map 408). For instance, the semantic layout system 106 determines attention feature matching subsets for pixels with the mask or an expanded mask. In some implementations, when limiting the number of query features, the semantic layout system 106 may also select one or more additional query features outside of the mask.

Returning to FIG. 4B, as mentioned above, for each feature in the layout feature map 406b (e.g., query index 414), in one or more implementations, the semantic layout system 106 determines a subset of corresponding features from the image feature map 406a (e.g., around 5% of the total number of features). In these implementations, a subset may include matching and nonmatching features, where each pair between the query index 414 and a sample key index 416 has a feature matching score (i.e., an attention correspondence 418). In some cases, a nonmatching feature may have an attention correspondence 418 of zero or near zero while a matching feature may have an attention correspondence 418 closer to one or another top-end limit. The semantic layout system 106 may aggregate each subset to create the sparse point set $\mathbb{C}_p$, (e.g., the sparse correspondence feature map 408), which notes both the subset of features in the image feature map 406a that corresponds to each feature in the layout feature map 406b and related attention correspondences (e.g., feature matching scores).

As shown in FIG. 4B, the semantic layout system 106 can utilize the deformable convolutional layer 422 in connection with the sparse correspondence feature map 408, which the semantic layout system 106 uses in connection with the input image 302 to generate the warped image 308, as described above. In one or more implementations, the deformable convolutional layer 422 represents the semantic layout system 106 performing a deformable convolutional operation on the sparse correspondence feature map 408. For example, the semantic layout system 106 convolves multiple features from sample key features corresponding to a given corresponding feature in the layout feature map 406b to generate a warped pixel value for the given feature. The semantic layout system 106 then repeats the deformable convolution for each of the features in the layout feature map 406b until a warped pixel value is determined for each pixel therein, which forms the warped image 308.

In various implementations, when determining a warped pixel value for a pixel of the warped image 308, the semantic layout system 106 weights each feature in the subset of features from the image feature map 406a based on its feature similarity score with the given feature in the layout feature map 406b. Indeed, for feature pairs that have higher attention correspondences 418 (e.g., shown as thicker dashed lines), the semantic layout system 106 may apply a higher weight or influence than other feature pairs in the subset having low attention correspondences 418.

As mentioned above, for each query feature p, the semantic layout system 106 may constrain the search space of key q to be in a sparse set $\mathbb{C}_p$ where $|\mathbb{C}_p| \ll HW$. Accordingly, in these implementations, the semantic layout system 106 may follow the formulation shown in Equation 4 below to generate the warped image 308 from the input image 302 (represented as x) and the sparse set $\mathbb{C}_p$ (e.g., the sparse correspondence feature map 408).

$$r(p) = \sum_{q \in \mathbb{C}_p} a_{p,q} x(q) \qquad (4)$$

$$a_{p,q} = e^{\gamma s_{p,q}} / \sum_{q \in \mathbb{C}_p} e^{\gamma s_{p,q}}$$

As shown in Equation 4, $a_{p,q}$ may represent the linear weight computed from the cross-domain feature similarity (e.g., $s_{p,q}$) and $\gamma$ may represent a coefficient that controls SoftMax temperatures. Indeed, in various implementations, the warping operation of Equation 4 may determine the warped image 308 from the sparse and irregular grid (e.g., the sparse set $\mathbb{C}_p$).

In one or more implementations, to further improve the efficiency of generating the warped image 308, the semantic layout system 106 may first normalize the matching score S($\mathbb{C}_p$) via a SoftMax operation. In some implementations, the semantic layout system 106 may also implement the sparse attention layer 404, or portions thereof, in the GPU of a computing device to also increase computing efficiency.

In various implementations, the semantic layout system 106 performs the deformable convolution utilizing the formulation shown in Equation 5 below.

$$y(p) = \sum_{k=1}^{K} w_k \cdot x(p + q_k + \Delta q_k) \cdot \Delta m_k \qquad (5)$$

As shown in Equation 5, $q_k$ may represent the offsets of the convolutional kernel and $\Delta q_k$ and $\Delta m_k$ may represent the offset and modulation factor for the kth location. In one or more implementations, when $p+q_k+\Delta q_k$ is fractional, the semantic layout system 106 applies bilinear interpolation to compute $x(p+q_k+\Delta q_k)$. Moreover, in example implementations, the semantic layout system 106 sets $q_k = S_k(\mathbb{C}_p) - p - q_k$ and $w_k$ to 1 and $\Delta m_k$ to the computed SoftMax-normalized attentive weights to implement the sparse attention warping and utilize weighted averages over all locations $S_k(\mathbb{C}_p)$ from the key index set $S(\mathbb{C}_p)$.

While the sparse attention network 310 is applicable to general global alignment tasks, in one or more implementations, to obtain improved local alignment, the semantic layout system 106 optimizes the key index sampling algorithm in several ways, which helps to improve warping quality for local editing. For example, the semantic layout system 106 modifies the feature matching scores at each evaluation step such that matching for different semantic labels is penalized. In particular, the semantic layout system 106 may modify the matching scores at each evaluation step such that matching for different semantic labels is penalized. To achieves this, in one or more implementations, the semantic layout system 106 additionally warps the one-hot semantic label map and computes the $\ell_1$ distance between the warped label map and the content label map. The semantic layout system 106 may next add the negative distance to the feature matching score before determining the top-M matching value selection.

As another example, the semantic layout system 106 performs particle sampling only in local windows around the position of the current particle (e.g., the window size is annealed in each iteration and decayed to zero). More particularly, in a number of implementations, the semantic layout system 106 performs particle sampling only in local windows around the position of the current particles whereas the window size w is annealed in each iteration and decayed to zero. Specifically, $w=w_0 e^{-\lambda i} \mathbb{1}$ (i<$i_t$) where $w_0$ is the initial window size, $\lambda$ is the decay rate, i is the iteration step, and $i_t$ is a constant threshold term.

As a further example, the semantic layout system 106 performs additional propagation steps in each iteration. In particular, in one or more implementations, the semantic layout system 106 performs more propagation steps in each iteration of key index sampling to enforce spatial coherency.

Moreover, regarding training the sparse attention network 310, in various embodiments, the semantic layout system 106 compares error loss between low-resolution and high-resolution versions of the sparse correspondence feature map 408. For instance, the semantic layout system 106 builds a low-resolution attention warped image neural network that generates a correlation matrix (in place of the sparse correspondence feature map) that correlates each pixel in an input image with each pixel in a edited layout. Next, the semantic layout system 106 up-samples the correlation matrix to high-resolution. In these implementations, the semantic layout system 106 can compare the distillation loss between the upscaled correlation matrix and the high-resolution sparse correspondence feature map 408 and/or warped images generated from these mappings. The semantic layout system 106 can then tune layers of the sparse attention warped image neural network 310 back-propagation of the distillation loss.

In one or more implementations, the semantic layout system 106 applies a spatially-adaptive denormalization to reconstruct an output image from a warped image such that the output image follows the style of input images and the layout of edited layouts. In some instances, the semantic layout system 106 employs random spatial transformation to generate edited layouts and ground truth images for training (e.g., training with paired data). Additionally, in various implementations, the semantic layout system 106 employs unpaired training by utilizing edited layouts that include similar semantics to a given input training image (e.g., training with unpaired data).

In various implementations, the semantic layout system 106 employs feature matching loss and domain alignment loss to train the sparse attention network 310. For example, in one or more implementations, the semantic layout system 106 employs the objective functions shown in Equations 6 and 7 below.

$$\mathcal{L}_{feat} = \sum_{l} \lambda_l \| \phi_l(\hat{y}_{x_0,c_0}) - \phi_l(y_0) \| \quad (6)$$

$$\mathcal{L}_{domain}^{\ell_1} = \| f_{x_0}^h - f_{c(x_0)}^h \| \quad (7)$$

As shown, Equation 6 corresponds to feature matching loss and Equation 7 corresponds to domain alignment loss. Both Equations 6 and 7 correspond to training the sparse attention warped image neural network 310 with paired data. In implementations where data is unpaired, the semantic layout system 106 employs perceptual loss and contextual loss as shown below in Equations 8 and 9.

$$\mathcal{L}_{perc} = \| \phi_l(\hat{y}_{x_1,c_1}) - \phi_l(x_1) \| \quad (8)$$

$$\mathcal{L}_{perc} = \text{contextual}(\hat{y}_{x_1,c_1}, x_1) \quad (9)$$

In some implementations, the semantic layout system 106 imposes a cycle-consistency constraint such that the input images are made consistent with the forward-backward warped image in low-resolution, as shown in Equation 10 below.

$$\mathcal{L}_{cycle} = \| r^l - r^l_{cycle} \| \quad (10)$$

In Equation 10, $r^l(p) = \Sigma_q \text{softmax}_{q \in \mathcal{G}^l}(\propto a_{p,q}^l) x'(q)$ may represent the densely warped image in low-resolution and $r_{cycle}^l(p) = \Sigma_q \text{softmax}_{q \in \mathcal{G}^l}(\propto a_{q,p}^l) r^l(q)$ may represent the forward-backward warped image. Further, $a_{p,q}^l$ may represent the normalized attention coefficient on down-sampled feature maps.

In one or more implementations, during training, the semantic layout system 106 applies correspondence distillation loss for a first among of epochs (e.g., 20 epochs) and removes the loss for the remainder of training (e.g., an additional 40 epochs). In some implementations, the semantic layout system 106 employs an Adam optimizer and a learning rate of 0.0002 to train the sparse attention network 310.

While FIGS. 4A-4B illustrate a particular architecture with respect to the sparse attention warped image neural network 310, in some implementations, the semantic layout system 106 utilizes additional and/or different elements. For instance, the semantic layout system 106 utilizes one or more different encoders and/or decoders to generate the high-resolution feature maps for the input image 302 and edited layout 304. For example, the semantic layout system 106 utilizes an addition neural network components and/or layers to generate feature maps and/or warped images.

As mentioned above, in various implementations, the semantic layout system 106 utilizes the sparse attention network 310 to generate warped images 308 and/or locally warped images 420. Often, warped images may contain appearance discontinuities due to pixel misalignment. In some instances, warped images may be aligned, but include artifacts that cause the warped images to appear unrealistic. Accordingly, in various implementations, the semantic layout system 106 utilizes a digital image generator neural network to refine the warped images into accurate, realistic, and aligned refined images. For example, as described above, the semantic layout system 106 utilizes the digital image layout neural network 320 to generate refined images from warped images.

Figure 5:
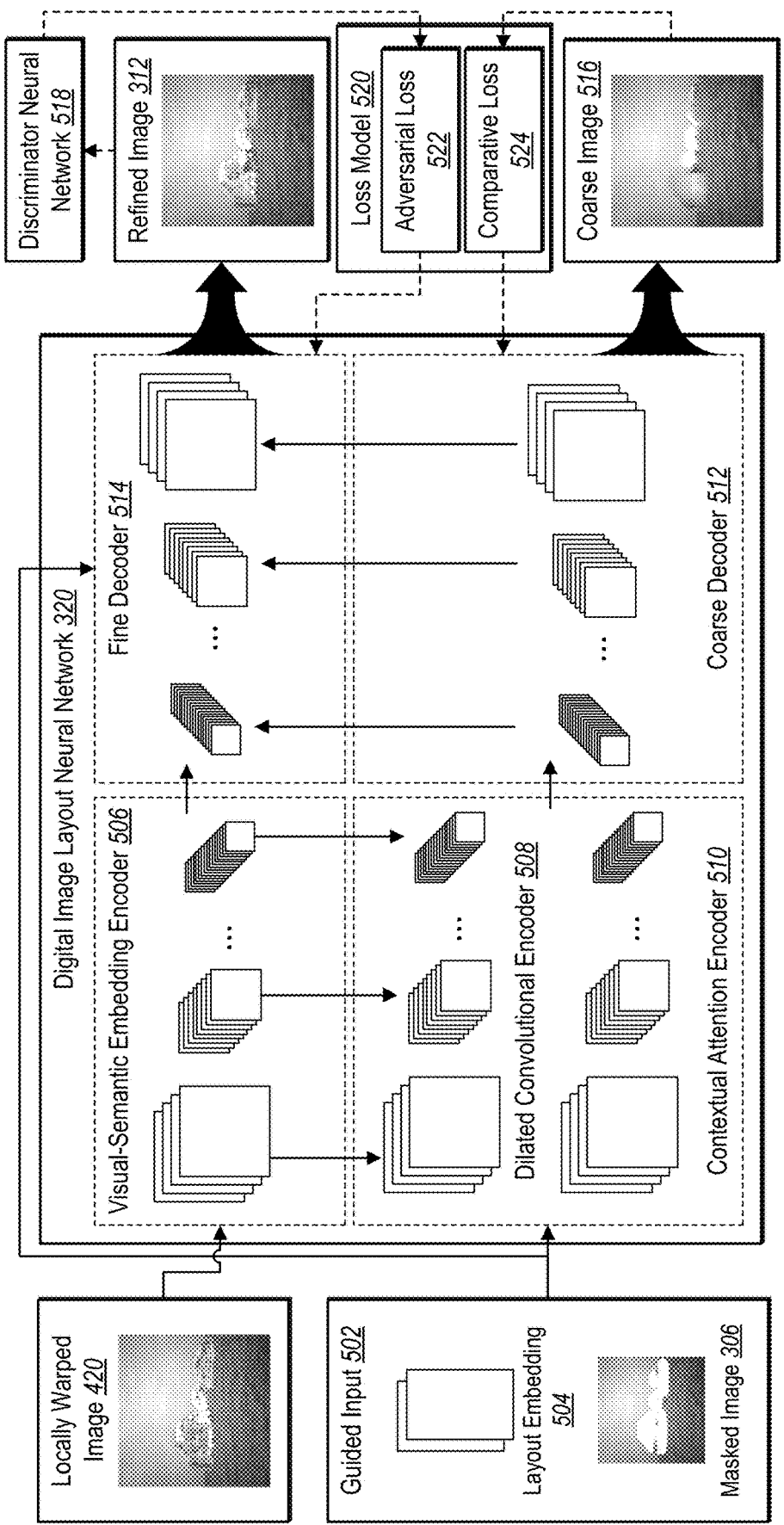
FIG. 5 illustrates a block diagram of a digital image layout neural network in accordance with one or more implementations.

To illustrate, FIG. 5 shows a block diagram of a digital image layout neural network 320 in accordance with one or more implementations. As shown, in addition to the digital image layout neural network 320, FIG. 5 includes the locally warped image 420, guided input 502, a coarse image 516, a refined image 312, a discriminator neural network 518, and a loss model 520. As also, shown, the digital image layout neural network 320 includes a visual-semantic embedding encoder 506, a dilated convolutional encoder 508, a contextual attention encoder 510, a coarse decoder 512, and a fine decoder 514.

In various implementations, the visual-semantic embedding encoder 506 (or simply "semantic encoder 506") processes the locally warped image 420 to extract a warped image semantic feature set (e.g., semantic features). In this manner, the semantic encoder 506 can capture semantic and structural information from a locally warped image 420 (i.e., a warped image), which are often noisy due to misalignment and/or artifacts.

In one or more implementations, the semantic layout system 106 utilizes a pre-trained visual-semantic embedding (VSE) model (e.g., encoder and/or neural network) to extract the multi-scale visual features (e.g., semantic features) from the locally warped image 420. For example, in some implementations, the semantic encoder 506 follows the formulation shown in Equation 11 below.

$$f^{(1)},f^{(2)},f^{(3)},f^{(4)}=VSE(x_{warp}) \tag{11}$$

As shown, in one or more implementations, the semantic layout system 106 provides the warped image feature set extracted from the locally warped image 420 to the fine decoder as well as the dilated convolutional encoder 508 and/or the contextual attention encoder 510. In these implementations, the semantic encoder 506 can serve as a first encoder of the digital image layout neural network 320.

As mentioned above, the digital image layout neural network 320 includes the dilated convolutional encoder 508 and the contextual attention encoder 510. In one or more implementations, the dilated convolutional encoder 508 and the contextual attention encoder 510 are separate encoders. In these implementations, the dilated convolutional encoder 508 represents a second encoder and the contextual attention encoder 510 represents a third encoder of the digital image layout neural network 320. In alternative implementations, the dilated convolutional encoder 508 and the contextual attention encoder 510 are combined into a combined encoder. For example, the combined encoder includes neural network layers and/or blocks corresponding to both convolutional dilatation and contextual attention. In these implementations, the combined encoder represents a second encoder of the digital image layout neural network 320.

In various implementations, the dilated convolutional encoder 508 and/or the contextual attention encoder 510 generate an encoded feature set from various inputs. For example, as shown, the dilated convolutional encoder 508 and/or the contextual attention encoder 510 process the warped image semantic feature set from the semantic encoder 506 and the guided input 502. In various implementations, the semantic layout system 106 provides intermediate features from the warped image semantic feature set to the dilated convolutional encoder 508 and/or the contextual attention encoder 510.

In some implementations, the guided input 502 includes a layout embedding 504, which is generated from the edited layout 304 (i.e., the edited semantic layout map) of the input image 302 and provides semantic guidance from the edited layout 304 to help propagate contextual information. For instance, in some implementations, the semantic layout system 106 extracts the layout embedding 504 from a one-hot semantic layout map (i.e., the edited layout 304) utilizing a 1×1 convolutional layer. Additionally, the guided input 502 includes a masked image 306 generated from the input image 302 and the masked image 306, as further described below with respect to FIG. 7A.

In one or more implementations, the dilated convolutional encoder 508 and/or the contextual attention encoder 510 encodes visual information from neighboring regions of the input image 302 into a set of encoded features. In some implementations, the dilated convolutional encoder 508 and/or the contextual attention encoder 510 focus the set of encoded features to pixels within the mask of the masked image 306. Indeed, in many implementations, because the digital image layout neural network 320 focuses on enhancing the warped portion of the locally warped image 420 inside the masked area, the dilated convolutional encoder 508 and/or the contextual attention encoder 510 generates the set of encoded features for inside and/or near the edges of the mask, as indicated by the masked image 306.

As mentioned above, the digital image layout neural network 320 includes a coarse-to-fine decoder for generating modified or refined images. In particular, as shown, the digital image layout neural network 320 includes the coarse decoder 512 (e.g., a first decoder) and the fine decoder 514 (e.g., a second decoder). In alternative implementations, the coarse decoder 512 and the fine decoder 514 are combined into a single decoder (or the digital image layout neural network 320 only uses one of the decoders). Accordingly, these decoders represent inpainting models that enhance, fill-in, or inpaint the warp pixels from the locally warped image 420 to output realistic and refined images.

Further, in one or more implementations, the coarse decoder 512 and the fine decoder 514 utilize a spatially-adaptive normalization (SPADE) architecture to perform semantic image synthesis and generate enhanced output images. For example, the semantic layout system 106 utilizes the formulation shown in Equation 12 below to generate synthetic images with respect to each or both decoders.

$$y=G(x,c,m)\odot m+x\odot(1-m) \tag{12}$$

As shown in Equation 12, y may represent an output image (e.g., a coarse image 516 or a refined image 312). G may represent a generator neural network (e.g., the digital image layout neural network 320 or a portion thereof), x may represent the input image 302, and c may represent the edited layout 304. Further, in may represent an image mask such that $x\odot(1-m)$ represents the masked image 306. By following Equation 12, in various implementations, the semantic layout system 106 aims to hallucinate new pixels inside of the mask such that generated content inside the mask is aligned to the edited layout and coherent with the neighboring content, which can provide a smooth and realistic transition from pixels inside the mask to outside pixels.

As shown in the illustrated implementation, the coarse decoder 512 (e.g., a first-stage decoder) generates a first set of decoded features, which are provided to the fine decoder 514 (e.g., a second-stage decoder). In various implementations, the coarse decoder 512 provides intermediate features from the first set of decoded features (such as after various neural network layers of the coarse decoder 512) to corresponding neural network layers of the fine decoder 514. Utilizing this approach, the semantic layout system 106 can better exploit the contextual propagation layers of the first-stage model. In addition, as shown, the coarse decoder 512 generates a coarse image 516, which initially improves the locally warped image 420.

The fine decoder 514, as shown, generates the refined image 312. In particular, in one or more implementations, the fine decoder 514 processes the warped image semantic feature set from the semantic encoder 506, the guided input 502 including the layout embedding 504 of the edited layout 304, and the first set of decoded features from the coarse decoder 512 to synthesize the refined image 312. Indeed, based on processing various semantic, contextual, and attention information of the warped pixels with the locally warped image 420, the fine decoder 514 can generate a refined image 312 that accurately and realistically enhances the area of the warped pixels (e.g., pixels within the mask). In this manner, the fine decoder 514 assists the digital image layout neural network 320 in generating a refined image the matches the style of the input image 302 while also following the layout of the edited layout 304.

Regarding training the digital image layout neural network 320, in various implementations, the semantic layout system 106 first trains the different portions separately, then jointly. For example, as mentioned above, in some implementations, the semantic encoder 506 is pre-trained to generate visual embeddings (e.g., the warped image semantic feature set).

Additionally, in one or more implementations, the semantic layout system 106 trains a Stage-1 network portion of the digital image layout neural network 320 that includes the dilated convolutional encoder 508 and/or the contextual attention encoder 510 along with the coarse decoder 512. For example, in various implementations, the semantic layout system 106 utilizes pixel-wise $\ell_1$ loss and perceptual loss (e.g., comparative loss) to give coarse predictions. To illustrate, FIG. 5 includes the loss model 520, which includes comparative loss 524. As shown, the semantic layout system 106 utilizes the loss model 520 and the comparative loss 524 to determine one or more measures of loss (e.g., coarse image loss), which are used to tune portions of the Stage-1 network (e.g., the dilated convolutional encoder 508 and/or the contextual attention encoder 510 along with the coarse decoder 512).

In one or more implementations, the semantic layout system 106 determines the comparative loss 524 based on comparing generated coarse images to ground truth data. In various implementations, the semantic layout system 106 generates ground truth data. For example, the semantic layout system 106 applies random affine transformations (e.g., overlying obstructions) to a digital image as well as to its semantic layout. The semantic layout system 106 then utilizes the obstructed image as an input image and the original image as the corresponding ground truth (e.g., a pseudo-ground truth). Similarly, the semantic layout system 106 utilizes the unobstructed semantic layout as the edited layout, such that the digital image layout neural network 320 learns to generate an image that follows the semantic layout as well as the style of the unobstructed image. A visual example of an obstructed input image and corresponding ground truth is described and shown in FIG. 9B, as described further below.

Upon training the Stage-1 network, the semantic layout system 106 trains a Stage-2 network portion of the digital image layout neural network 320, which can include the fine decoder 514. For example, in various implementations, the semantic layout system 106 trains the Stage-2 network utilizing a combination of pixel-wise $\ell_1$ loss and perceptual loss (e.g., comparative loss), and adversarial loss.

To illustrate, FIG. 5 shows the loss model 520 that includes adversarial loss 522 and the comparative loss 524 (i.e., perceptual loss). In various implementations, the semantic layout system 106 determines adversarial loss 522 by providing the refined image 312 to the discriminator neural network 518. As described above, the discriminator neural network 518 attempts to determine whether an input image is real or synthetic. Based on the accuracy of its prediction, the semantic layout system 106 determines the adversarial loss 522, which is used to tune both the Stage-2 network (e.g., the fine decoder 514) as shown as well as the discriminator neural network 518.

While training the Stage-2 network as described above, in one or more implementations, the semantic layout system 106 jointly trains the Stage-1 network utilizing pixel-wise $\ell_1$ loss. For example, the semantic layout system 106 back propagates the combined loss, as described above, to the fine decoder 514 while also back-propagating the pixel-wise $\ell_1$ loss to the coarse decoder 512, the dilated convolutional encoder 508, and/or the contextual attention encoder. In various implementations, the semantic layout system 106 utilizes the formulation shown in Equation 13 below.

$$\mathcal{L}_G = \lambda_{\ell 1}\mathcal{L}_{\ell 1-Stage1} + \lambda_{L1}\mathcal{L}_{\ell 1-Stage2} + \lambda_{prec}\mathcal{L}_{prec} - \lambda_{adv} \mathbb{E}_{z \sim p(z)}[D(x_{out}, c, m)] \quad (13)$$

In Equation 13, G may represent the digital image layout neural network 320, or a generator neural network that is part of a GAN. In addition, λ may represent balanced terms. Further, to train the discriminator neural network 518 (e.g., the adversarial part of the GAN), in some implementations, the semantic layout system 106 follows the hinge loss formulation provided in Equation 14 below.

$$\mathcal{L}_D = \mathbb{E}_{z \sim p_{data}}[\sigma(1 - D(x, c, m))] + \mathbb{E}_{z \sim p(z)}[\sigma(1 - D(x_{out}, c, m))] \quad (14)$$

In one or more implementations, the semantic layout system 106 trains the digital image layout neural network 320 to synthesize refined images as a whole. In some implementations, the semantic layout system 106 trains the digital image layout neural network 320 to focus on local refinement. In these implementations, the semantic layout system 106 utilizes the image mask and masked images, as described above, to primarily focus on refining warped pixels of an image. In this manner, the semantic layout system 106 can improve efficiency by training the digital image layout neural network 320 to be much more precise, efficient, and accurate with respect to a lesser number of warped pixels rather than for all pixels in a high-resolution image.

While FIG. 5. 5 illustrates a particular architecture with respect to the digital image layout neural network 320, in some implementations, the semantic layout system 106 utilizes additional and/or different elements. For instance, the semantic layout system 106 utilizes one or more different encoders and/or decoders to generate the coarse images 516 and/or refined images 312. For example, the semantic layout system 106 omits the semantic encoder 506 and/or replaces it with a different encoder. As another example, the semantic layout system 106 utilizes an addition neural network components and/or layers to synthesize refined images 312.

Figure 6A:
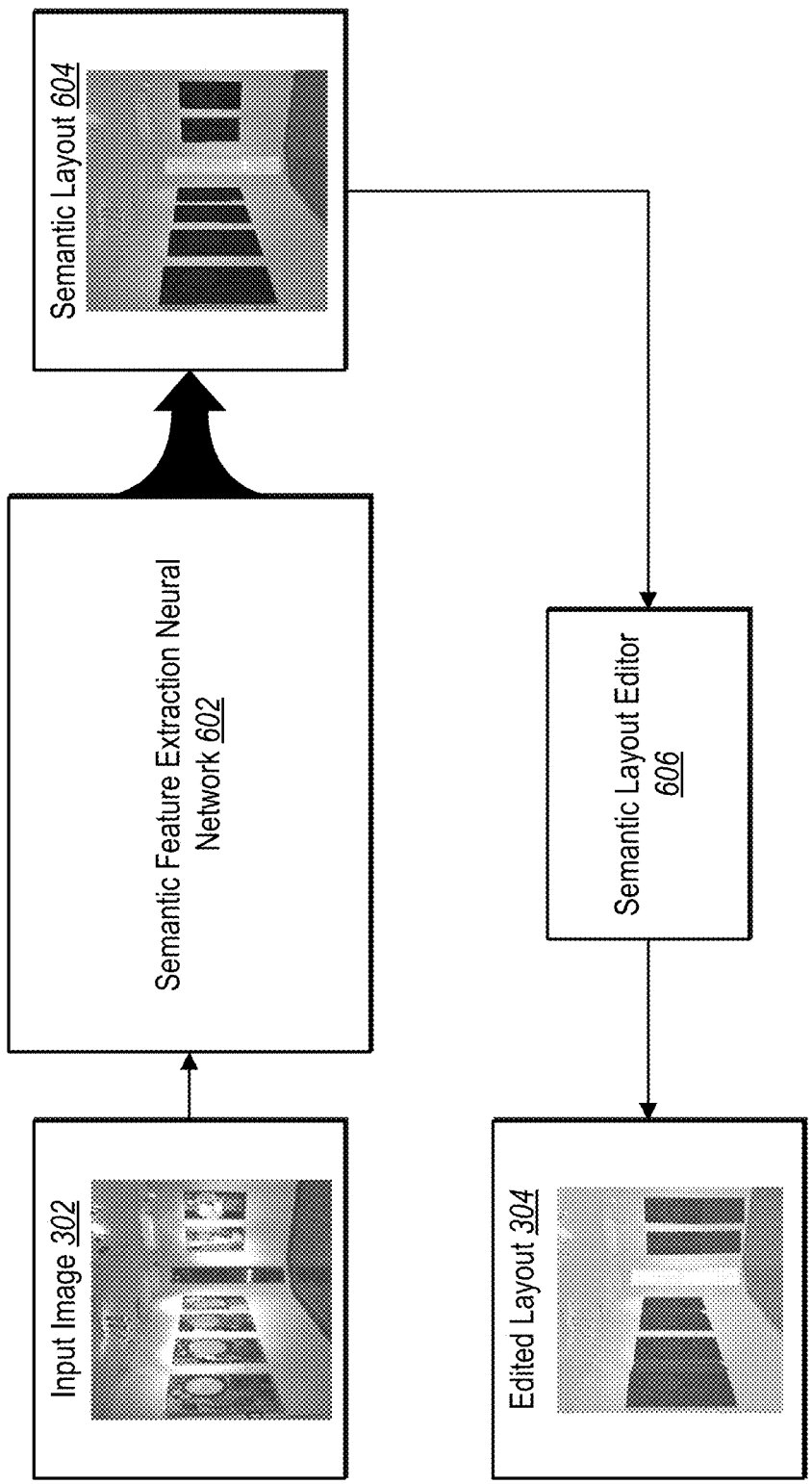
FIGS. 6A-6C illustrate block diagrams of generating edited semantic layouts in accordance with one or more implementations.
Figure 6B:
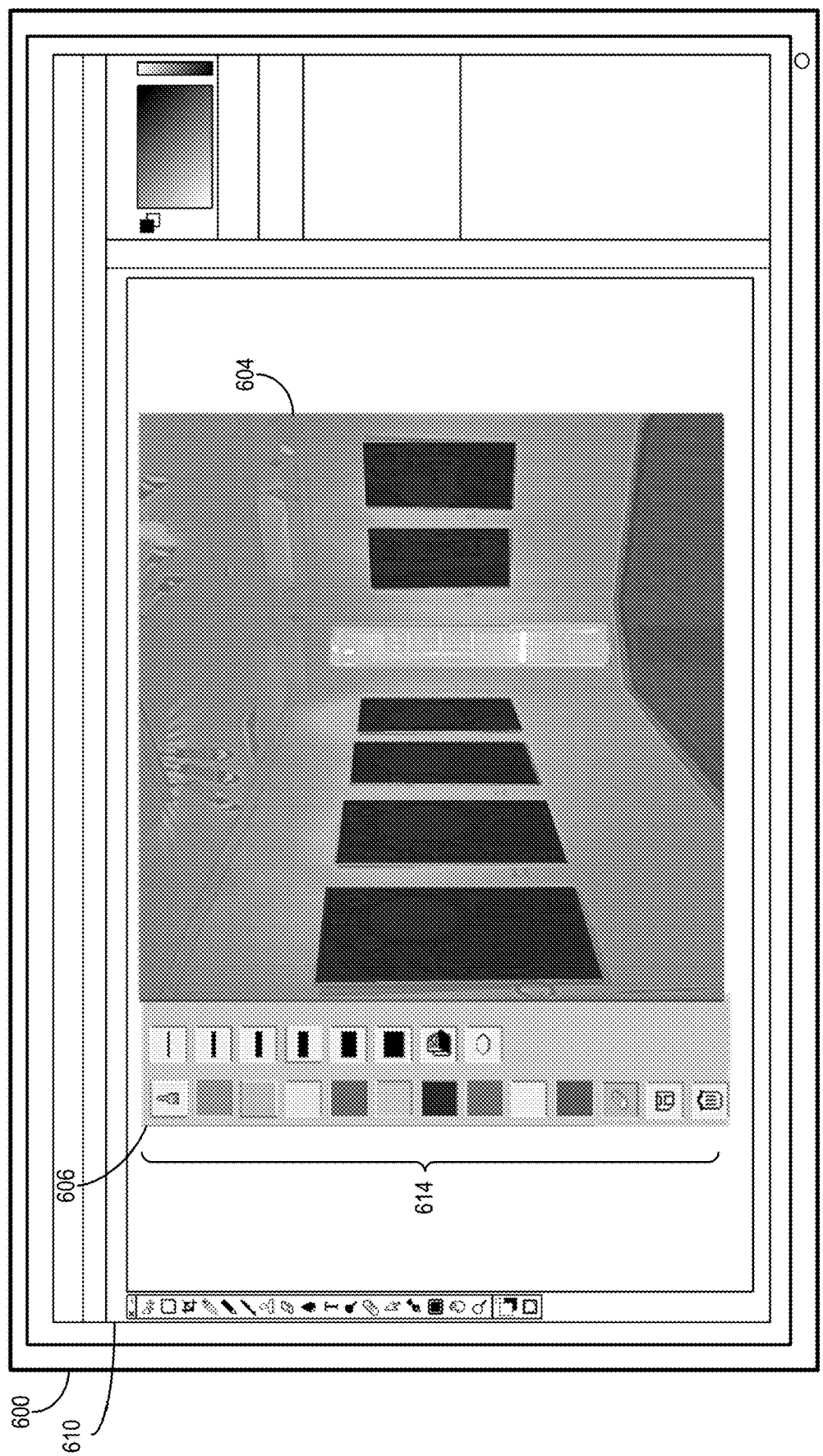
Figure 6C:
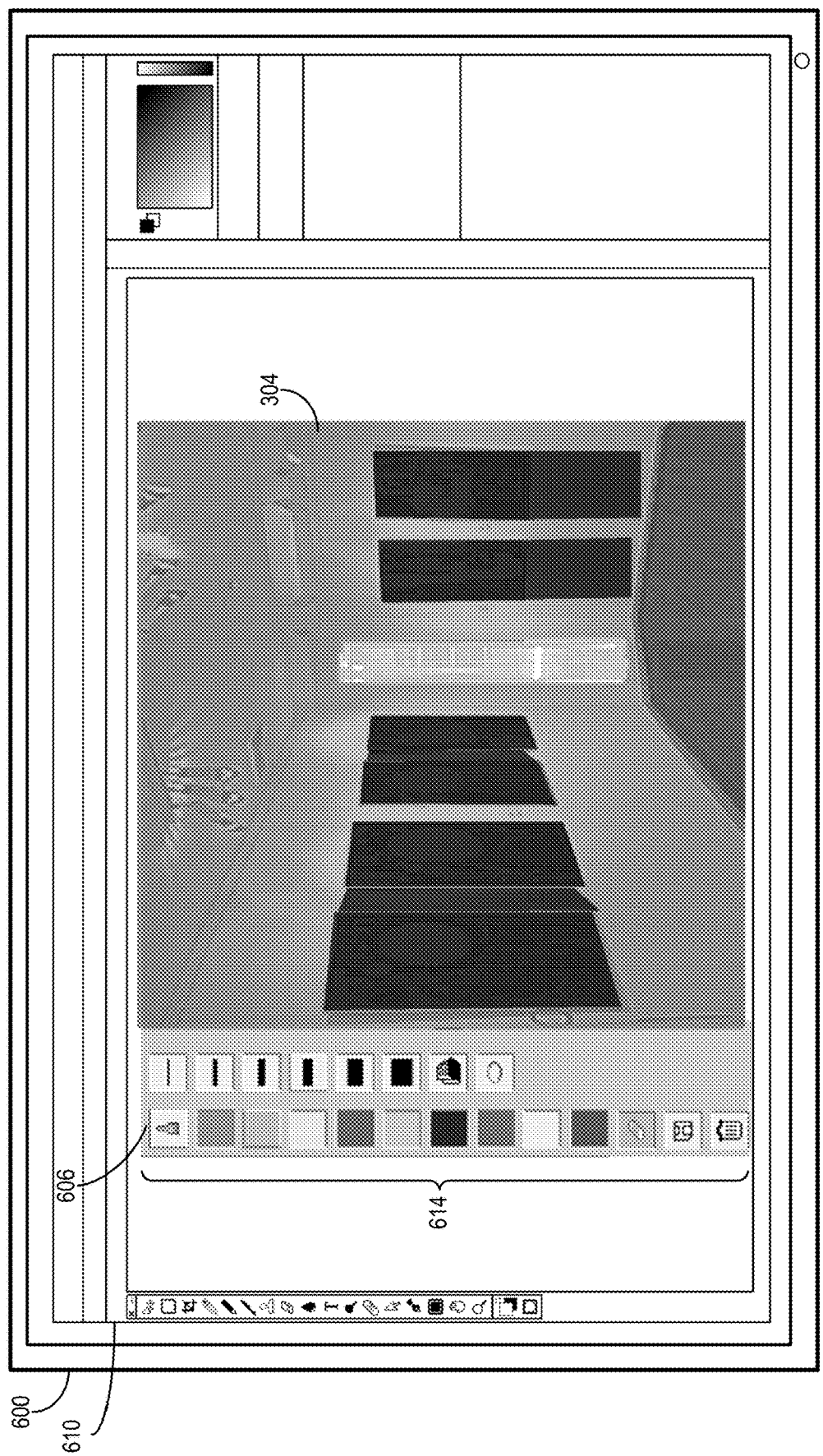

As mentioned above, FIGS. 6A-6C provide additional detail regarding generating edited layouts 304. For instance, FIGS. 6A-6C illustrate diagrams of generating edited semantic layouts in accordance with one or more implementations. More specifically, FIG. 6A shows a block diagram of generating edited semantic layouts. FIGS. 6B-6C show generating an edited semantic layout within a semantic layout editor.

As shown, FIG. 6A includes the input image 302, a semantic feature extraction neural network 602, a semantic layout 604, a semantic layout editor 606, and the edited layout 304 (i.e., edited semantic layout map). In one or more implementations, the semantic layout system 106 utilizes the semantic feature extraction neural network 602 to generate the semantic layout 604 (i.e., semantic layout map) from the input image 302. In some implementations, the semantic feature extraction neural network 602 generates the semantic layout 604 as a one-hot semantic layout label map.

As described above, a semantic layout assigns classification labels to each pixel in a digital image, where groups of similar labels form a semantic region. For example, the input image 302 shows a gallery of paintings, including four paintings on a left wall and two paintings on a back wall. The semantic feature extraction neural network 602 can generate a semantic layout 604 and label each pixel displaying a painting as "art" or "painting." Further, in some instances, the semantic feature extraction neural network 602 labels other pixels in the semantic layout as "wall", "floor," "ceiling," "lights," and/or "door."

In many implementations, the edited layout 304 is created from the semantic layout 604 (i.e., semantic layout map). For example, input is detected via the semantic layout editor 606 that expands, reduces, replaces, or removes one or more semantic regions from the semantic layout 604. In some implementations, a user provides input via a client device. In alternative implementations, a computing device automatically provides input to modify a semantic layout 604.

FIGS. 6B-6C show an example user interface of a semantic layout editor 606. In particular, FIGS. 6B-6C show a computing device 600, such as a client device associated with a user, having a graphical user interface 610 displaying the semantic layout editor 606. In one or more implementations, the semantic layout editor 606 is part of the image editing application and/or image editing system 104 described above.

As shown, the semantic layout editor 606 includes various semantic layout tools 614 and selectable graphical options to modify semantic areas within a semantic layout 604. Examples of semantic layout tools 614 facilitate selecting, expanding, adding, or removing some or all of a semantic area as well as relabeling a semantic area with a new classification (e.g., semantic label).

As shown, in FIG. 6B, the semantic layout editor 606 includes the semantic layout 604. In various implementations, the semantic layout editor 606 detects a selection of a semantic label that matches that of the paintings. Further, the semantic layout editor 606 may detect input expanding the semantic areas between various semantic regions to create the edited layout 304.

To illustrate, FIG. 6C shows the edited layout 304 within the semantic layout editor 606. As shown, the four semantic areas indicating the four paintings on the left wall have been combined into two semantic areas. Additionally, the two semantic areas indicating the two paintings on the back wall have each been extended toward the floor. Indeed, in various implementations, the computing device 600 receives input from one of the semantic layout tools 614 to combine separate semantic areas as well as expand existing semantic areas, which results in additional pixels in the edited layout 304 being labeled with a target semantic label.

In one or more implementations, the semantic layout editor 606 facilitates combining semantic areas and/or semantic labels from one semantic layout to another semantic layout. For example, the semantic layout system 106 generates a first semantic layout for a first digital image that includes a landscape and a second semantic layout for a second digital image including a person. The semantic layout editor 606 may detect input adding the semantic area of the person from the second semantic layout to the first semantic layout. Then, as described above, the semantic layout system 106 follows the edited first semantic layout to generate a refined image that shows the person in the landscape.

Figure 7A:
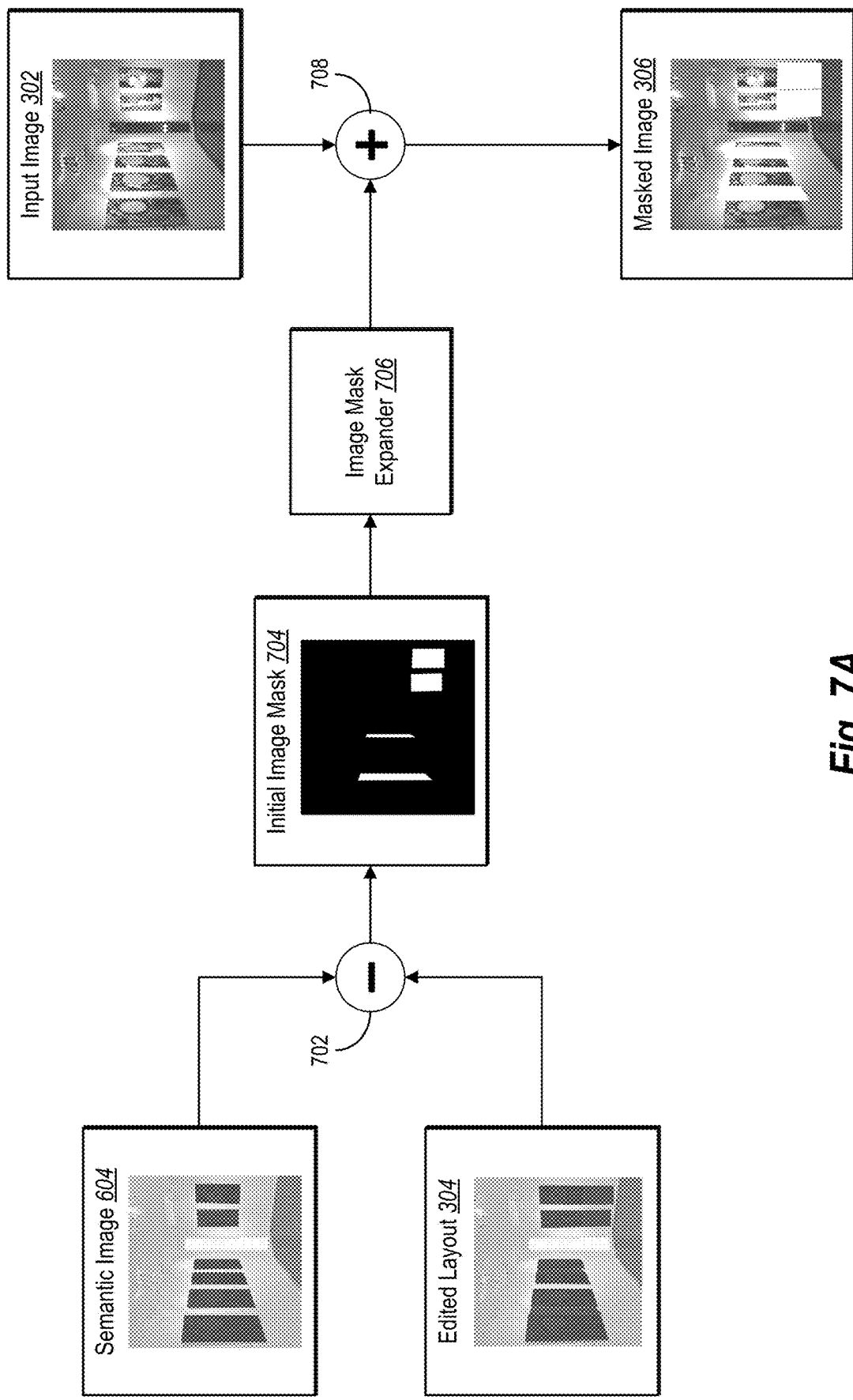
FIGS. 7A-7B illustrate block diagrams of generating a masked input image in accordance with one or more implementations.
Figure 7B:
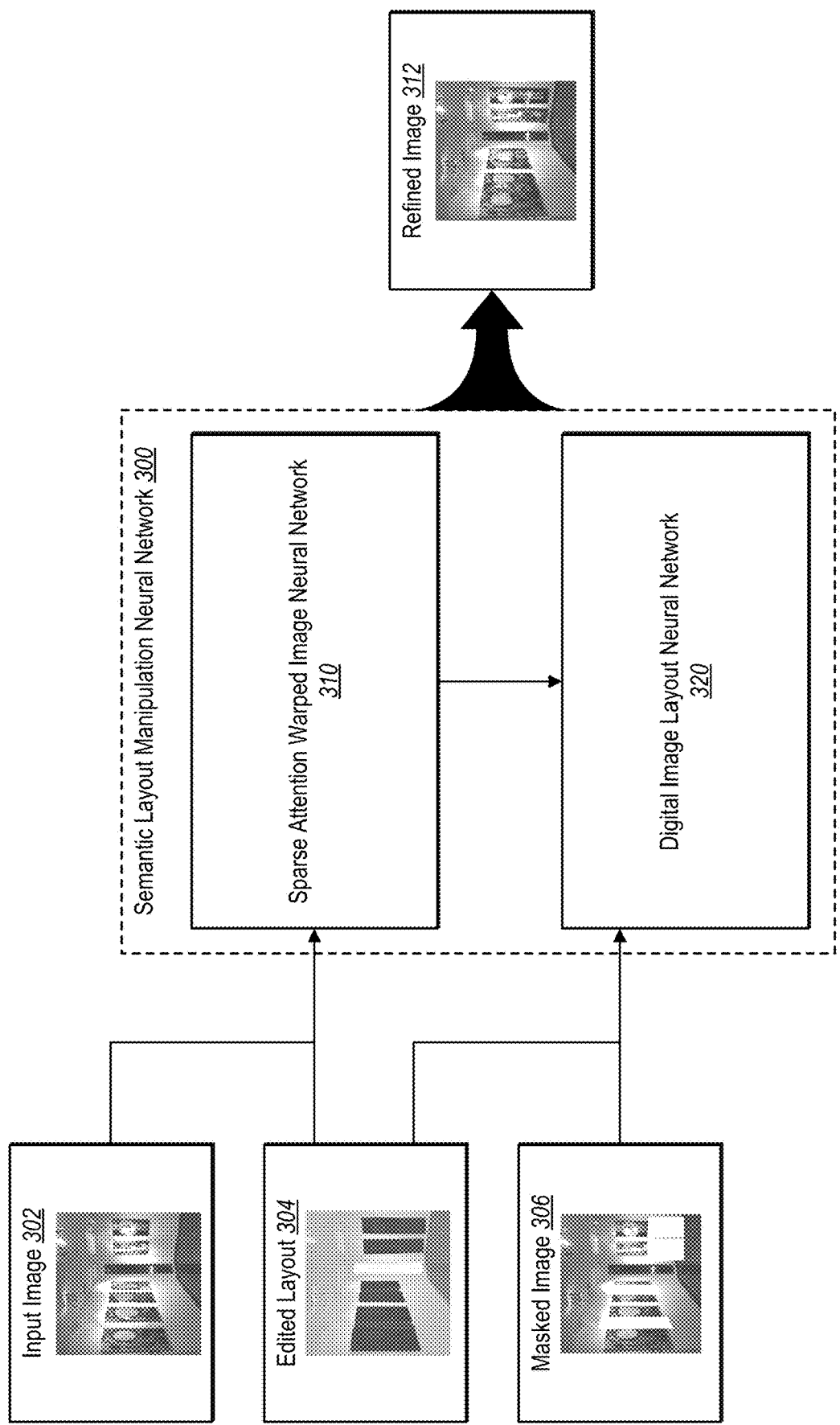

As mentioned above, additional detail regarding generating masked images is provided with respect to FIGS. 7A-7B. In particular, FIGS. 7A-7B illustrate block diagrams of generating a masked input image in accordance with one or more implementations. In particular, FIG. 7A shows generating a masked input image. FIG. 7B shows the semantic layout system 106 generating a refined image based on the example images provided in FIGS. 6A-6C and FIG. 7A.

As shown, FIG. 7A includes the semantic layout 604 and the edited layout 304 as described above. In various implementations, the semantic layout system 106 compares the semantic layout 604 (i.e., a semantic layout map) and the edited layout 304 (i.e., an edited semantic layout map) at a comparer 702 to determine where the semantic layout 604 has been edited. Additionally, the semantic layout system 106 may generate an initial image mask 704, which indicates pixels where the edited layout 304 differs from the semantic layout 604. In various implementations, the semantic layout system 106 utilizes the initial image mask 704 as the image mask described above.

In alternative implementations, the semantic layout system 106 expands the initial image mask 704 before utilizing it. For instance, as shown, the semantic layout system 106 utilizes an image mask expander 706 to enlarge portions to the initial image mask 704. For example, in one or more implementations, the image mask expander 706 increases the positive (e.g., white) areas of the initial image mask 704 by 10% (or by another value). In this manner, the semantic layout system 106 enables for a smooth, realistic, and gradual transition between the warped pixels within the mask and non-warped pixels without the mask.

As shown, in various implementations, the semantic layout system 106 combines the expanded image mask from the image mask expander 706 with the input image 302 at a combiner 708 to generate the masked image 306. As described above, in some implementations, the semantic layout system 106 utilizes the masked image 306 to generate a locally warped image from a warped image.

In various implementations, the semantic layout system 106 includes the masked image 306 within the guided input provided to the digital image layout neural network 320 to generate a refined image. To illustrate, FIG. 7B shows the semantic layout system 106 generating a refined image based on the example images provided in FIGS. 6A-6C and FIG. 7A. As shown in FIG. 7B, the semantic layout system 106 provides the input image 302, the edited layout 304, and the masked image 306 to the semantic layout manipulation neural network 300. The semantic layout system 106 then utilizes the sparse attention warped image neural network 310 and the digital image layout neural network 320, as described above, to generate the refined image 312 to align or follow the edited layout 304 while matching the style and coherency of the input image 302.

Figure 8C:
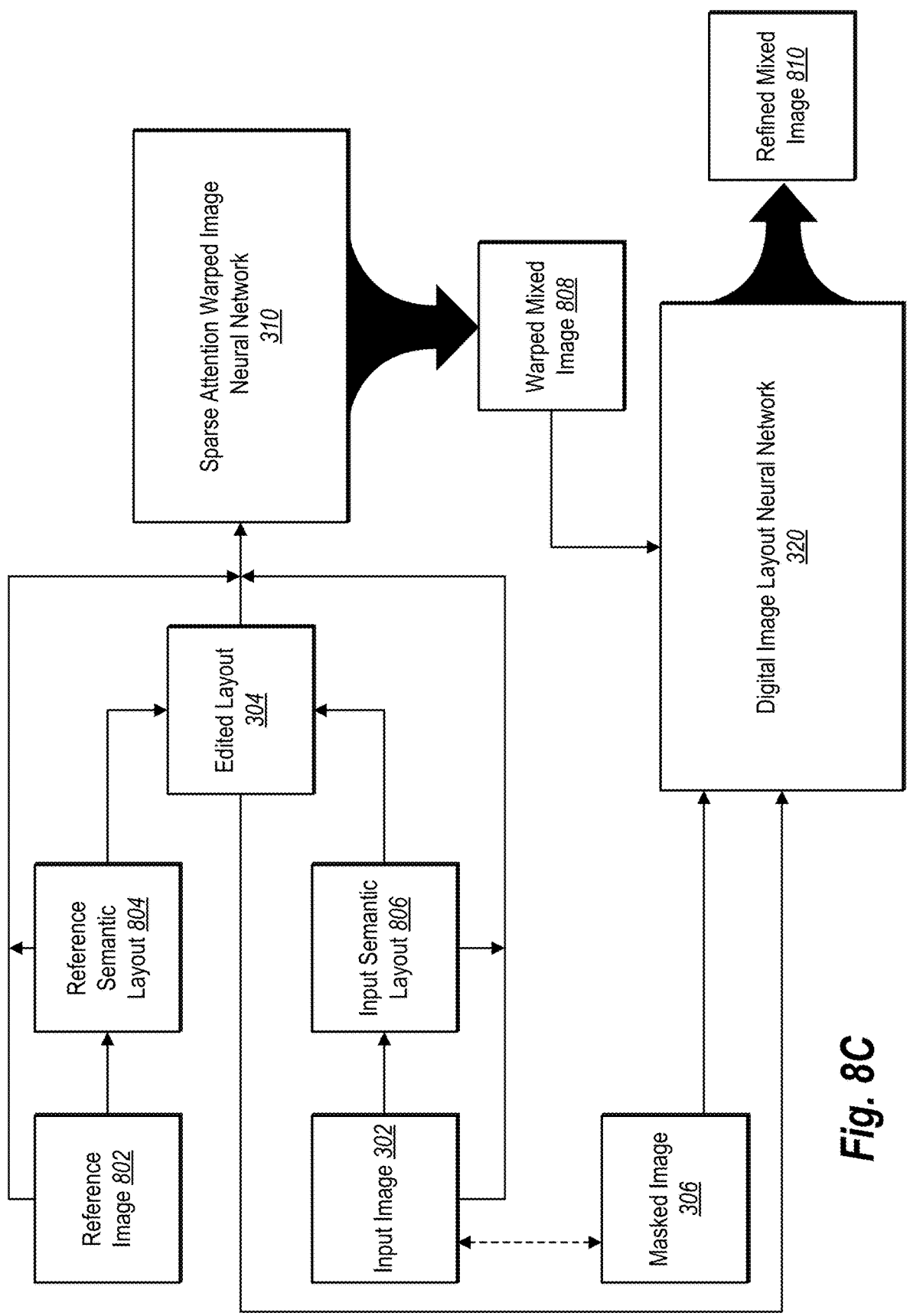

As mentioned above, in various implementations, the semantic layout system 106 can generate refined images from multiple input images. Indeed, in these implementations, the semantic layout system 106 generates a refined mixed image based on semantic information from the multiple input images. To illustrate, FIGS. 8A-8C show block diagrams of generating refined mixed digital images based on an input image, a reference image, and an edited semantic layout in accordance with one or more implementations. In particular, FIGS. 8A-8B show examples of generating refined mixed images. FIG. 8C shows a block diagram of the semantic layout system 106 generating a refined mixed image.

As shown, FIGS. 8A-8B each includes an input image 302, a reference image 802, an edited layout 304 (i.e., an edited semantic layout map), and a refined mixed image 810. More particularly, FIG. 8A shows an input image 302 of a helicopter in a landscape with low mountains in the background. The reference image 802 shows a large red-rock butte. The edited layout 304 shows the semantic region for the low mountains being replaced with an expanded semantic region corresponding to the red-rock butte of the reference image 802. Based on the edited layout 304, the refined mixed image 810 shows the input image 302 being modified to show larger red-rock mountains in the background.

FIG. 8B shows an input image 302 of a wooden cabin nestled in front of a desert hill and a reference image 802 of a landscape with dense trees in the background and a dark sky. The edited layout 304 expands the semantic region of the cabin on the right side and replaces the background hill and sky with semantic regions corresponding to the reference image 802. As a result, the refined mixed image 810 shows a cabin with an expanded structure against a hill of dense trees and a dark sky.

As shown, in various implementations, the semantic layout system 106 generates refined mixed images 810 that synthesize from one or more areas of multiple input images. For example, the semantic layout system 106 separately warps contents from the input image 302 and the reference image 802 and fuses them according to the edited layout 304 to generate a warped mixed image, which is then refined utilizing the digital image layout neural network.

To further illustrate, as mentioned above, FIG. 8C shows a block diagram of the semantic layout system 106 generating a refined mixed image. As illustrated, FIG. 8C includes a reference image 802 and an input image 302 as introduced above. In addition, FIG. 8C also includes the sparse attention warped image neural network 310 and the digital image layout neural network 320 described above.

In various implementations, the semantic layout system 106 generates semantic layouts of the reference image 802 and the input image 302. For instance, the semantic layout system 106 utilizes a semantic feature extraction neural network to generates semantic layouts, as described above with respect to FIG. 6A. As shown, the semantic layout system 106 generates a reference semantic layout 804 for the reference image 802 and an input semantic layout 806 for the input image 302.

Additionally, in one or more implementations, the semantic layout system 106 generates an edited layout 304 (i.e., an edited semantic layout). For example, the semantic layout system 106 receives input that modifies the input semantic layout 806 to modify one or more semantic regions, as described above. In some implementations, the semantic layout system 106 receives input that adds a semantic region from the reference semantic layout 804 to the input semantic layout 806. In this manner, the edited layout 304 includes semantic regions corresponding to semantic labels from both the input image 302 and the reference image 802.

To illustrate by way of example, suppose the input semantic layout 806 includes semantic regions with the labels "Helicopter," "Grass," "Mountains," and "Sky" (see FIG. 8A). Further suppose that the reference semantic layout 804 includes the semantic regions with labels of "Butte" and "Sky." In this example, the semantic layout system 106 receives input modifying the input semantic layout 806 to remove the semantic region labeled with "Mountain" and add a semantic region of "Butte" to generate the edited layout 304. Because semantic regions correspond to concept and content within images, the edited layout 304 indicates regions with the semantic layout system 106 to synthesize new pixels that match the style of a digital image rather than copy and paste pixels or objects from the digital image.

In various implementations, the social networking system generates a masked image 306 as described above with respect to FIG. 7. For example, the semantic layout system 106 compares the edited layout 304 to the input semantic layout 806 to determine differences between semantic regions. In this manner, the semantic layout system 106 is able to target which pixels to warp and which pixels to leave unchanged.

As shown, the semantic layout system 106 generates a warped mixed image 808 utilizing the sparse attention warped image neural network 310 (or simply the "sparse attention network 310"). For example, in various implementations, the sparse attention network 310 receives the edited layout 304, the input image 302, and the input semantic layout 806 as described above. Additionally, the sparse attention network 310 receives the reference image 802 and the reference semantic layout 804. In this manner, the sparse attention network 310 draws upon the input image 302 for semantic regions in the edited layout 304 that match semantic labels from the input semantic layout 806 and draws upon the reference image 802 for semantic regions in the edited layout 304 that match semantic labels from the reference semantic layout 804. Based on these inputs, the sparse attention network 310 generates the warped mixed image 808 utilizing the approaches described above with respect to FIGS. 4A-4B.

Further, in various implementations, the semantic layout system 106 generates a refined mixed image 810. For example, in one or more implementations, the semantic layout system 106 utilizes the digital image layout neural network 320 to enhance the warped mixed image 808 utilizing the approaches described above with respect to FIG. 5. In particular, the semantic layout system 106 utilizes the digital image layout neural network 320 to refine the warped pixels within the warped mixed image 808 and combines the refined pixels with the masked image 306 to generate the refined mixed image 810, as described above.

By utilizing multiple input images (e.g., a reference image), the semantic layout system 106 is able to perform a variety of functions. For example, in one or more implementations, the semantic layout system 106 performs object insertion by manipulating a semantic layout for an input image to insert objects from a reference image. In some implementations, the semantic layout system 106 transfers image attributes from a reference image to areas within an input image. In various implementations, the semantic layout system 106 facilitates object shape manipulation and scene attribute editing via one or more additional reference images. Indeed, the semantic layout system 106 enables textures and designs to be edited and added from any number of digital images to an input image.

Figure 9A:
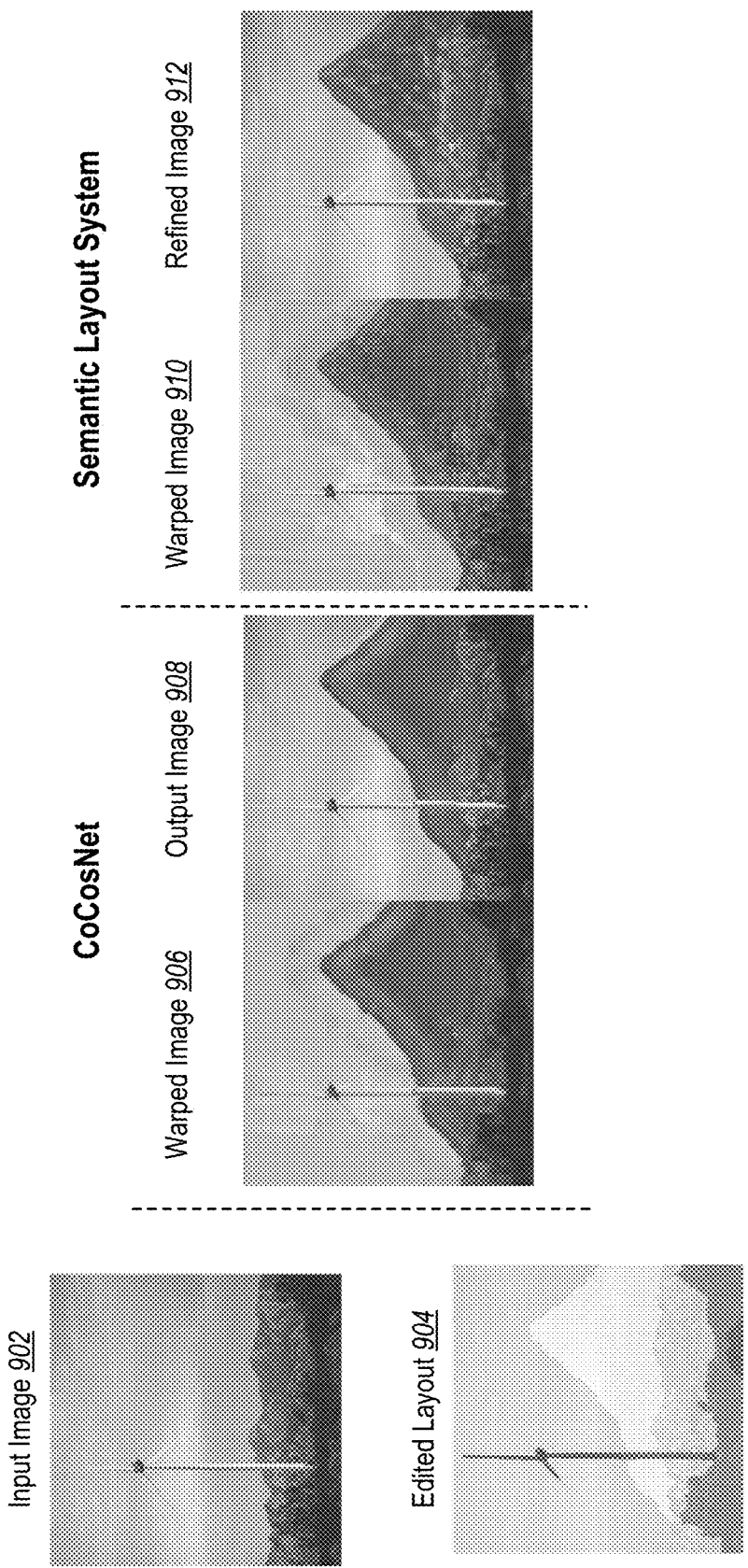
FIGS. 9A-9B illustrate qualitative results comparing one or more implementations of the semantic layout system with state-of-the-art systems.
Figure 9B:
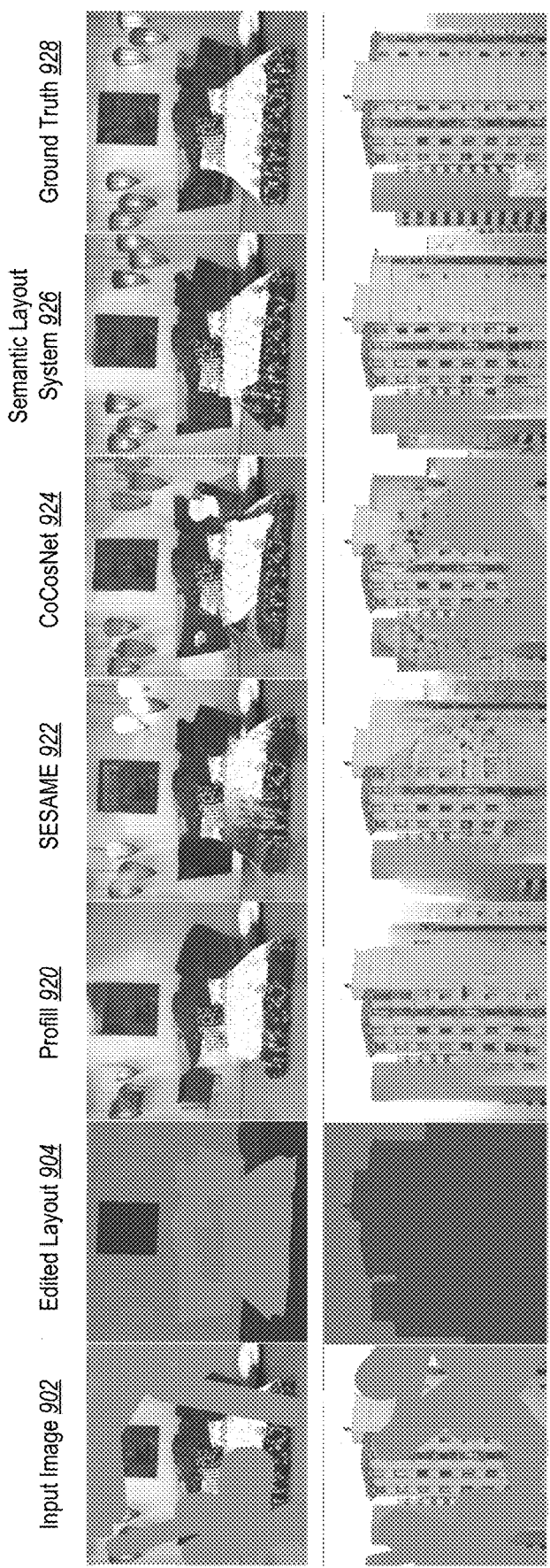

Turning now to FIGS. 9A-9B, qualitative and quantitative results comparing the semantic layout system 106 to state-of-the-art systems will be provided. For instance, FIG. 9A illustrates qualitative results comparing one or more implementations of the semantic layout system with a state-of-the-art system. As shown, FIG. 9A includes an input image 902 and a corresponding edited layout 904 (i.e., edited semantic layout). FIG. 9A also shows results from CoCosNet including a warped image 906 and an output image 908. Further, FIG. 9A shows results from an example implementation of the semantic layout system 106 including a warped image 910 and a refined image 912.

For context, the CoCosNet system provides a general framework for example—based image translation that synthesizes a photo-realistic image from the input of a semantic segmentation mask and an example image. In particular, additional detail regarding the CoCosNet system is described in P. Zhang et al., *Cross-Domain Correspondence Learning for Exemplar—based Image Translation*, on pages 5143-53 of the Proceedings of IEEE Computer Society Conference on Computer Vision and Pattern Recognition, 2020 (hereinafter "CoCosNet").

As shown in FIG. 9, the example implementation of the semantic layout system 106 generates a warped image 910 that includes a much higher granularity of detail than the warped image 906 of CoCosNet. More specifically, CoCos-Net and other conventional systems utilize low-resolution image transfers, which results in poor visual detail transfer from the input image 902. In contrast, the semantic layout system 106 (e.g., the sparse attention warped image neural network) can transfer high-resolution visual image details, which, in turn, results in improved semantic layout manipulation. Indeed, the detailed texture in the mountains shown in the warped image 910 is lost in the warped image 906 of the CoCosNet result.

Further, FIG. 9A shows that the refined image 912 of the example of the semantic layout system 106 is much more accurate and realistic than the output image 908 of the CoCosNet result. First, by starting with an improved warped image that includes a high level of visual details, the example of the semantic layout system 106 is able to generate an improved output. Second, even with similar warped images, the semantic layout system 106 produces a better, more realistic refined image than CoCosNet or other state-of-the-art systems.

To further illustrate, FIG. 9B shows additional output results from reconstruction tasks between an example of the semantic layout system 106 and other state-of-the-art-systems with respect to a reconstruction task. As shown, FIG. 9B includes inputs of input images 902 and edited layouts 904 (i.e., edited semantic layouts) and output images 920-928 from various systems. In particular, FIG. 9B includes output images from a state-of-the-art inpainting system (e.g., Profill 920), a semantic layout manipulation system (e.g., SESAME 922), and a global layout editing system (e.g., CoCosNet 924) as well as an example, of the semantic layout system 106.

Additionally, FIG. 9B shows images of ground truths 928. As described above, the ground truths 928 represent an original image and the edited layouts 904 are generated from the ground truths 928. The input images 902 are generated by modifying and obscuring the original image. In this manner, the various systems attempt to reconstruct the original image by filling in the obscured portions of the input images 902 with synthetic pixels that match the style of the input images 902 while also aligning with the edited layouts 904.

For context, the inpainting Profill 920 system is described in H. Zeng et al., *High—Resolution Image Inpainting With Iterative Confidence Feedback And Guided Upsampling*, found in preprint at arXiv:2005.11742, 2020; the semantic layout manipulation system SESAME 922 system is described in E. Ntavelis et al., *SESAME: Semantic Editing Of Scenes By Adding, Manipulating Or Erasing Objects*, found in preprint arXiv:2004.04977, 2020; and the global layout editing CoCosNet 924 system, which is referenced above.

As shown in FIG. 9B, the example of the semantic layout system 106 provides a refined image (e.g., semantic layout system 926) that is more realistic, less distorted, and overall more accurate to the ground truths 928 than the other state-of-the-art-systems. Additionally, the example of the semantic layout system 106 provides better detail in the local textures transferred from the input image 902 to the refined image. For instance, each of the state-of-the-art-systems struggled to generate accurate lights in the bedroom scene in the first row of results in FIG. 9A (e.g., they either missed lights, generated the wrong lights, or have grainy and rough-looking lights), while the semantic layout system 106 generated lights that are very close to the ground truth 928. In another instance, each of the state-of-the-art-systems struggled to generate an accurate looking building in the second row of results in FIG. 9B. Overall, the example implementation of the semantic layout system 106 better reconstructs the layout of the input images 902 as well as better preserves details from the input images 902 including texture, structure, and patterns.

Along with the qualitative results shown in FIGS. 9A and 9B, Tables 1-3 below show quantitative results. For example, Table 1 provides quantitative results from evaluating the reconstruction task (corresponding to the approach described with respect to FIG. 9B). In Table 1, higher scores are better for metrics with an up arrow and vice versa.

TABLE 1

| Methods | $\ell_1$err.↓ | PSNR↑ | SSIM↑ | LPIPS↓ | FID↓ | $\mathcal{L}_{style}$↓ |
|---|---|---|---|---|---|---|
| ADE20k Dataset | | | | | | |
| Profill | 0.02875 | 22.405 | 0.848 | 0.317 | 97.78 | 8.35e−06 |
| SESAME | 0.06032 | 18.505 | 0.720 | 0.319 | 66.45 | 1.30e−05 |
| CoCosNet | 0.03600 | 20.678 | 0.823 | 0.317 | 99.68 | 6.28e−06 |
| Semantic Layout System | 0.02384 | 23.048 | 0.870 | 0.249 | 58.27 | 2.78e−06 |
| Places365 Dataset | | | | | | |
| Profill | 0.05597 | 18.758 | 0.699 | 0.298 | 103.17 | 1.211e−05 |
| SESAME | 0.06050 | 18.586 | 0.684 | 0.326 | 119.72 | 1.406e−05 |
| CoCosNet | 0.07750 | 16.841 | 0.644 | 0.356 | 134.80 | 1.235e−05 |
| Semantic Layout System | 0.05419 | 19.177 | 0.708 | 0.268 | 89.25 | 0.02719e−05 |

Table 2 shows quantitative results from evaluating a semantic manipulation task. In Table 2, higher scores are better for metrics with an up arrow and vice versa.

TABLE 2

| Methods | $\ell_1$err.↓ | PSNR↑ | SSIM↑ | LPIPS↓ | FID↓ | $\mathcal{L}_{style}$↓ |
|---|---|---|---|---|---|---|
| ADE20k Dataset | | | | | | |
| SESAME | 0.03561 | 20.825 | 0.834 | 0.178 | 47.40 | 5.281e−06 |
| CoCosNet | 0.03454 | 21.505 | 0.843 | 0.165 | 40.76 | 3.144e−06 |
| Semantic Layout System | 0.02968 | 22.255 | 0.856 | 0.139 | 29.15 | 2.729e−06 |
| Places365 Dataset | | | | | | |
| SESAME | 0.02617 | 22.957 | 0.879 | 0.118 | 49.24 | 1.831e−06 |
| CoCosNet | 0.03176 | 22.266 | 0.868 | 0.127 | 48.20 | 1.312e−06 |
| Semantic Layout System | 0.02796 | 23.002 | 0.880 | 0.106 | 33.83 | 1.107e−06 |

As shown by the empirical evidence in Tables 1 and 2, the example embodiment of the semantic layout system 106 described herein outperforms prior work for image both reconstruction and manipulation tasks. For context, Tables 1 and 2 include results from measurements with various accuracy metrics, including pixel-wise loss $\ell_1$ loss (es Mean Square Error (MSE)), PSNR (peak signal-to-noise), and SSIM (structural similarity index measurement) as low-level metrics. In addition, Tables 1 and 2 include results from measurements perceptual-level metrics including FID (Frchet Inception Distance), LPIPS (Perceptual image patch similarity distance), and style similarity loss. As shown, both Tables 1 and 2 include results from two validation datasets including the ADE20k Dataset found at B. Zhou et al., *Scene Parsing Through ADE20k Dataset*, on pages 633-641 of the Proceedings of IEEE Computer Society Conference on Computer Vision and Pattern Recognition, 2017 (herein "ADE20k *Dataset*") as well as B. Zhou et al., *Places*: A 10 Million Image Database For Scene Recognition, published in the IEEE Transactions on Pattern Analysis and Machine Intelligence, 2017 (herein "*Places*365 *Dataset*").

In addition, researchers performed an ablation study to analyze different components of the semantic layout system 106. For example, the researchers trained three model variants. In the first variant, the semantic layout system 106 utilizes only the digital image layout neural network, but without the visual-semantic embedding encoder (labeled as "Vanilla"). In the second variant, the semantic layout system 106 adds the sparse attention warped image neural network and keeps the same modified digital image layout neural network as the Vanilla variant (labeled as "Vanilla+Hi-Res Sparse-Attn"). In the third variant, the semantic layout system 106 utilizes the full digital image layout neural network as disclosed herein, including the high-resolution sparse attention warped image neural network and digital image layout neural network 320 with the visual-semantic embedding encoder and the coarse-to-fine decoder (labeled as "Digital Image Layout Network"). The results of the ablation study are shown below in Table 3.

TABLE 3

| Methods | $\ell_1$Err.↓ | PSNR↑ | SSIM↑ | LPIPS↑ | FID↓ | $L_{style}$ ↓ |
|---|---|---|---|---|---|---|
| Vanilla | 0.08454 | 13.663 | 0.805 | 0.240 | 147.43 | 1.779e−02 |
| Vanilla + Hi-Res Sparse-Attn. | 0.03268 | 21.100 | 0.866 | 0.144 | 48.22 | 3.476e−06 |
| Digital Image Layout Network | 0.02796 | 23.002 | 0.880 | 0.106 | 33.83 | 1.107e−06 |

For context, the variants in Table 3 were evaluated with the Places365 Dataset based on manipulation tasks. As shown in Table 3, providing a warped image to the digital image layout neural network substantially improves the model performance while utilizing the visual-semantic embedding encoder can further improve performance and accuracy. Indeed, the improvements of using the visual-semantic embedding encoder are reflected more on the semantic-aware metrics, such as LPIPS, FID, which are aligned better with visual quality.

Figure 10:
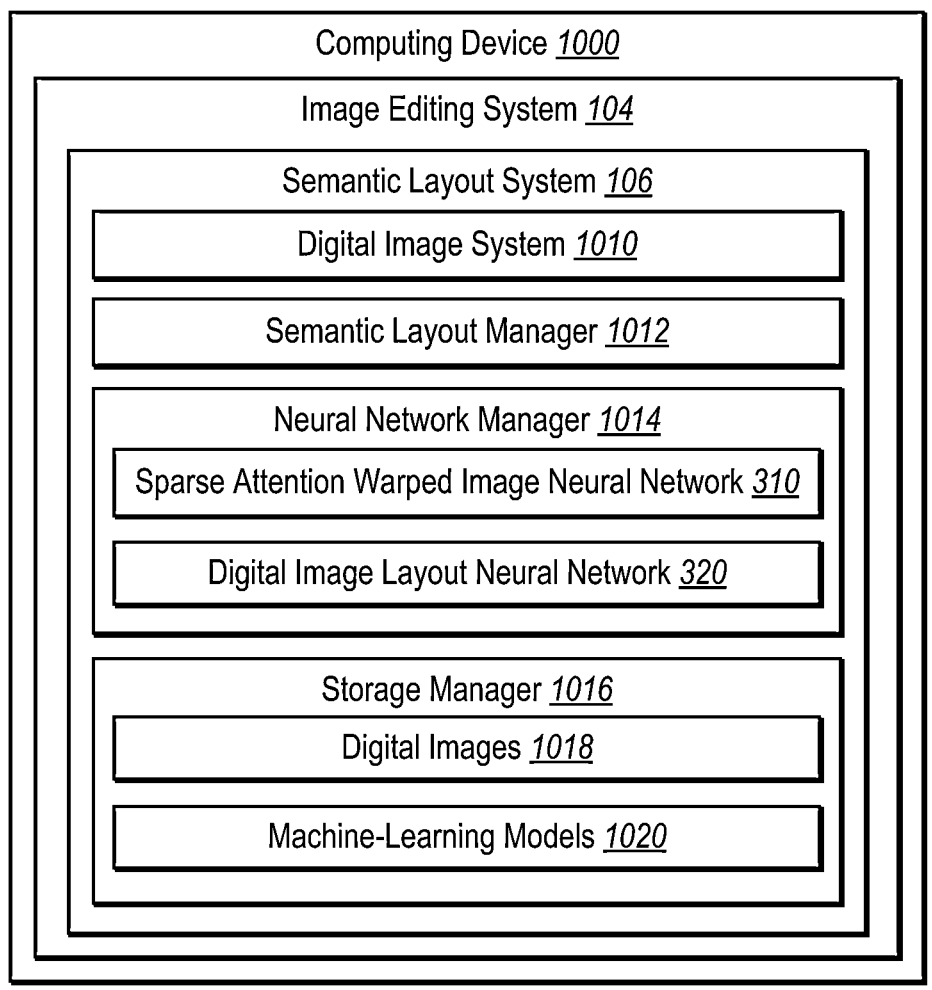
FIG. 10 illustrates a schematic diagram of the semantic layout system in accordance with one or more implementations.

Referring now to FIG. 10, additional detail is provided regarding the capabilities and components of a semantic layout system 106 in accordance with one or more implementations. In particular, FIG. 10 shows a schematic diagram of an example architecture of the semantic layout system 106 implemented within an image editing system 104 and hosted on a computing device 1000.

In addition, the computing device 1000 may represent various types of computing devices (e.g., the client device 102 and/or the server device 108). For example, in one or more implementations, the computing device 1000 is a mobile computing device, such as a laptop, a tablet, a mobile telephone, a smartphone, a wearable device, or a device connected to the internet. In some implementations, the computing device 1000 is a non-mobile computing device, such as a server, a cluster of servers, a desktop, or another type of non-mobile computing device. Additional details with regard to the computing device 1000 are discussed below with respect to FIG. 12.

As shown, the computing device 1000 includes the image editing system 104, which is described above, and the semantic layout system 106. The semantic layout system 106 includes various components for performing the processes and features described herein. To illustrate, the semantic layout system 106 includes a digital image manager 1010, a semantic layout manager 1012, a neural network manager 1014 (having a sparse attention warped image neural network 310 and a digital image layout neural network 320), and a storage manager 1016. As shown, the storage manager 1016 includes digital images 1018 and machine-learning models 1020.

As mentioned above, the semantic layout system 106 includes the digital image manager 1010. In general, the digital image manager 1010 facilitates identifying, accessing, receiving, obtaining, generating, importing, exporting, copying, modifying, removing, providing, and/or organizing digital images 1018. In some implementations, the digital image manager 1010 communicates with the storage manager 1016 to store and retrieve the digital images 1018, for example, within a digital image database managed by the storage manager 1016 (implemented via one or more memory devices). Examples of digital images include an input digital image, warped image, locally warped image, masked image, semantic layout, edited semantic layout, coarse image, and refined image.

As shown, the semantic layout system 106 includes the semantic layout manager 1012. In one or more implementations, the semantic layout manager 1012 facilitates generating, editing, identifying, accessing, receiving, obtaining, importing, exporting, copying, modifying, removing, providing, and/or otherwise managing semantic layouts including edited semantic layouts. For example, in one or more implementations, the semantic layout manager 1012 utilizes a semantic feature extraction neural network (e.g., stored as one of the machine-learning models 1020) to creates a semantic layout from a digital image, as described above. As also described above, in various implementations, the semantic layout manager 1012 facilitates creating edited layouts from semantic layouts utilizing a semantic layout editor application (or a portion thereof).

As shown, the semantic layout system 106 includes the neural network manager 1014 having a sparse attention warped image neural network 310 and a digital image layout neural network 320. In various implementations, the neural network manager 1014 maintains, creates, generates, trains, updates, accesses, and/or utilizes various machine-learning models 1020 including one or more neural networks. For example, the neural network manager 1014 trains and tunes the sparse attention warped image neural network 310 to generate warped images and locally warped images, as described above. As another example, the neural network manager 1014 trains and tunes the digital image layout neural network 320 to refine input images (e.g., warped images and locally warped images) to synthesize refined images, as described above. Further, the neural network manager 1014 facilitates the training and use of additional machine-learning models 1020, such as a semantic layout manipulation neural network, a digital image layout neural network, a multi-scale feature classification neural network, a deformable convolution neural network, a dilated neural network, a contextual attention neural network, and a semantic feature extraction neural network.

Each of the components 1010-1020 of the semantic layout system 106 may include software, hardware, or both. For example, the components 1010-1020 may include one or more instructions stored on a computer-readable storage medium and executable by processors of one or more computing devices, such as a client device (e.g., a mobile client device) or server device. When executed by the processors, the computer-executable instructions of the semantic layout system 106 may cause a computing device to perform the feature learning methods described herein. Alternatively, the components 1010-1020 may include hardware, such as a special-purpose processing device to perform a certain function or group of functions. In addition, the components 1010-1020 of the semantic layout system 106 may include a combination of computer-executable instructions and hardware.

Furthermore, the components 1010-1020 of the semantic layout system 106 may be implemented as one or more operating systems, as one or more stand-alone applications, as one or more modules of an application, as one or more plug-ins, as one or more library functions or functions that may be called by other applications, and/or as a cloud-computing model. Thus, the components 1010-1020 may be implemented as a stand-alone application, such as a desktop or mobile application. Additionally, the components 1010-1020 may be implemented as one or more web-based applications hosted on a remote server. The components 1010-1020 may also be implemented in a suite of mobile device applications or "apps." To illustrate, the components 1010-1024 may be implemented in an application, including but not limited to ADOBE PHOTOSHOP, ADOBE CREATIVE CLOUD, LIGHTROOM, PHOTOSHOP ELEMENTS, PHOTOSHOP EXPRESS, PHOTOSHOP MOBILE, or other digital content applications or software packages. The foregoing are either registered trademarks or trademarks of Adobe Inc. in the United States and/or other countries.

FIGS. 1-10, the corresponding text, and the examples provide several different methods, systems, devices, and non-transitory computer-readable media of the semantic layout system 106. In addition to the foregoing, one or more implementations may also be described in terms of flowcharts comprising acts for accomplishing a particular result, such as the flowcharts of acts shown in FIG. 11. Additionally, the acts described herein may be repeated or performed in parallel with one another or parallel with different instances of the same or similar acts.

Figure 11:
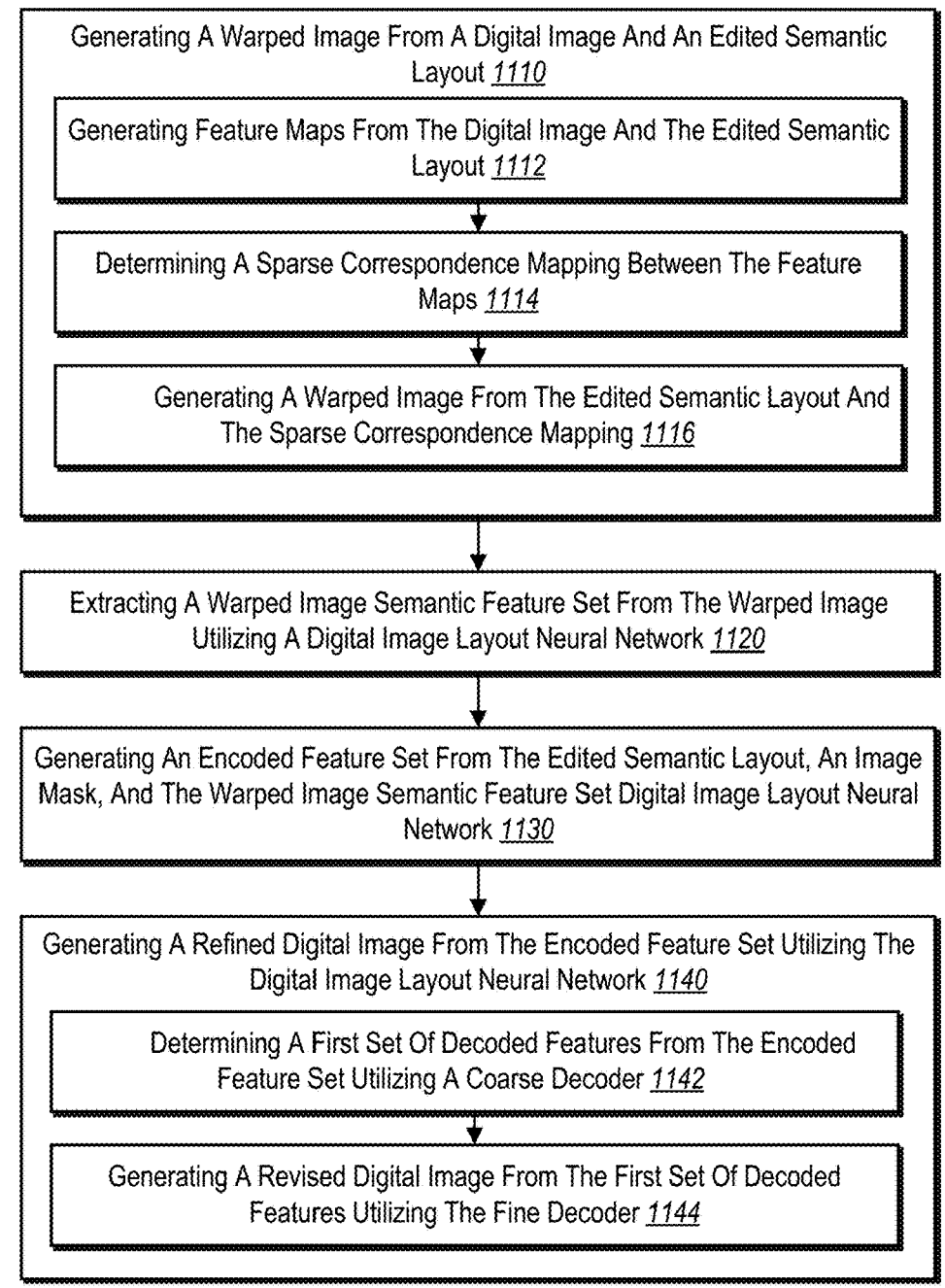
FIG. 11 illustrates a flowchart of a series of acts for generating refined digital images utilizing a sparse attention warped image neural network and a digital image layout neural network in accordance with one or more implementations.

While FIG. 11 illustrates acts according to one or more implementations, alternative implementations may omit, add to, reorder, and/or modify any of the acts shown in FIG. 11. The acts of FIG. 11 may be performed as part of methods. Alternatively, non-transitory computer-readable mediums may comprise instructions that, when executed by one or more processors, cause a computing device to perform the acts of FIG. 11. In some implementations, one or more systems may perform the acts of FIG. 11.

As mentioned previously, FIG. 11 illustrates a flowchart of a series of acts 1100 of generating refined digital images utilizing a sparse attention warped image neural network and a digital image layout neural network in accordance with one or more implementations. In one or more implementations, the series of acts 1100 is implemented on one or more computing devices, such as the client device 102, server device 108, or the computing devices 600, 1000. In addition, in some implementations, the series of acts are implemented in a digital medium environment for editing digital images. For example, the series of acts are implemented on a computing device having memory that includes a digital image layout neural network including an encoder, a coarse decoder, and a fine decoder. In another example, the memory includes a digital image, an edited semantic layout of the digital image, an image mask corresponding to the edited semantic layout, and a warped image of the digital image aligned to the edited semantic layout (e.g., edited layout map or edited semantic layout map).

As shown, the series of acts 1100 includes an act 1110 of generating a warped image from a digital image and an edited semantic layout. In particular, the act 1110 may involve generating a warped image from a digital image and an edited semantic layout utilizing a sparse attention warped image neural network. In some implementations, the act 1110 includes generating a first feature map for the digital image and a second feature map for the edited semantic layout and determining a sparse correspondence mapping between the first feature map and the second feature map by utilizing a patch matching algorithm to identify a subset of features from the first feature map corresponding to a given feature in the second feature map. In some implementations, the act 1110 includes generating a locally warped image by blending the warped image with the image mask generated from a semantic layout and the edited semantic layout and extracting the warped image semantic feature set from the locally warped image. In several implementations, the edited semantic layout, the digital image, and the sparse correspondence mapping each have a resolution equal to or greater than 512×512.

As shown, the act 1110 includes multiple sub-acts. For instance, the act 1110 includes the sub-act 1112 of generating feature maps from the digital image and the edited semantic layout. In particular, the sub-act 1112 may involve generating a first feature map from a digital image and a second feature map for an edited semantic layout. In one or more implementations, the sub-act 1112 includes generating the first feature map for the digital image utilizing a multi-scale feature classification neural network and generating the second feature map for the edited semantic layout utilizing the same or a different multi-scale feature classification neural network.

In addition, the act 1110 includes the sub-act 1114 of determining a sparse correspondence mapping between the feature maps. In particular, the sub-act 1114 may involve determining a sparse correspondence mapping between the first feature map and the second feature map by identifying a subset of features from the first feature map corresponding to a given feature in the second feature map. In some implementations, the sub-act 1114 includes utilizing a patch matching algorithm to identify the subset of features from the first feature map corresponding to the given feature in the second feature map. In one or more implementations, the sub-act 1114 includes identifying a subset of features from the first feature map corresponding to a given feature in the second feature map by determining an initial set of features corresponding to the given feature in the second feature map from a lower-resolution version of the first feature map and determining the subset of features corresponding to the given feature in the second feature map from the initial set of features and a higher-resolution version (e.g., at least 512×512 resolution or above) of the first feature map utilizing the patch matching algorithm.

Further, the act 1110 includes the sub-act 1116 of generating a warped image from the edited semantic layout and the sparse correspondence mapping. In particular, the sub-act 1116 may involve generating a warped image from the edited semantic layout and the sparse correspondence mapping by determining a warped pixel value for the given feature in the second feature map from the subset of features from the first feature map. In some implementations, the sub-act 1116 includes utilizing a deformable convolution layer to generate the warped pixel value from the subset of features from the first feature map corresponding to the given feature in the second feature map. In one or more implementations, the sub-act 1116 includes weighting each feature in the subset of features from the first feature map based on a feature similarity score between each feature in the subset of features and the given feature in the second feature map.

As shown, the series of acts 1100 also includes an act 1120 of extracting a warped image semantic feature set from the warped image utilizing a digital image layout neural network. In particular, the act 1120 may involve extracting a warped image semantic feature set from the warped image utilizing a first encoder of a digital image layout neural network. In some implementations, the act 1120 includes generating the warped image semantic feature set utilizing a visual-semantic embedding encoder and/or neural network.

As shown, the series of acts 1100 also includes an act 1130 of generating an encoded feature set from the edited semantic layout, an image mask, and the warped image semantic feature set digital image layout neural network. In particular, the act 1130 may involve generating an encoded feature set from the edited semantic layout, an image mask, and the warped image semantic feature set utilizing a second encoder of the digital image layout neural network. For example, in various implementations, the act 1130 includes generating a set of encoded features from the edited semantic layout, the image mask, and the warped image utilizing an encoder of the digital image layout neural network. In some implementations, the act 1130 includes generating the encoded feature set utilizing dilated neural network layers and/or contextual attention neural network layers of the second encoder.

As shown, the series of acts 1100 also includes an act 1140 of generating a refined digital image from the encoded feature set utilizing the digital image layout neural network. In particular, the act 1140 may involve generating a refined digital image from the encoded feature set utilizing a decoder of the digital image layout neural network. In some implementations, the act 1140 includes utilizing a coarse decoder and a fine decoder to generate the refined image. In various implementations, the act 1140 includes tuning parameters of the coarse decoder utilizing a comparative loss and tuning parameters of the fine decoder utilizing an adversarial loss.

As shown, the act 1140 includes multiple sub-acts. For instance, the act 1140 includes the sub-act 1142 of determining a first set of decoded features from the encoded feature set utilizing a coarse decoder. In some implementations, the sub-act 1142 includes utilizing the coarse decoder to generate a coarse image, which may be used to train the coarse decoder. In some implementations, the coarse decoder includes spatially-adaptive denormalization neural network layers.

In addition, the act 1140 includes the sub-act 1144 of generating a revised digital image from the first set of decoded features utilizing the fine decoder. In one or more implementations, the sub-act 1144 includes generating the revised digital image utilizing the fine decoder from the image mask, a layout embedding, and the set of encoded features. In various implementations, the sub-act 1144 includes processing intermediate features from the first set of decoded features generated by neural network layers of the coarse decoder utilizing corresponding neural network layers of the fine decoder. In some implementations, the fine decoder includes spatially-adaptive denormalization neural network layers.

The series of acts 1100 may include various additional acts. For example, the series of acts 1100 may include acts of extracting a warped image semantic feature set from the warped image utilizing a first encoder of a digital image layout neural network, generating an encoded feature set from the edited semantic layout, an image mask, and semantic features from the warped image semantic feature set utilizing a second encoder of the digital image layout neural network, generating a first set of decoded features and a coarse digital image from the encoded feature set utilizing a first decoder of the digital image layout neural network, and/or generating a refined digital image from the first set of decoded features utilizing a second decoder of the digital image layout neural network.

In one or more implementations, the series of acts 1100 may include acts of generating a semantic layout of a reference image that labels a target semantic area with a target semantic label, determining that the edited semantic layout includes a first portion including the target semantic label corresponding to the semantic layout of the reference image and a second portion that includes a semantic label corresponding to the semantic layout of the digital image, and generating the warped image by utilizing the sparse attention warped image neural network to warp the first portion of the edited semantic layout based on the reference image and the second portion of the edited semantic layout based on the digital image.

In various implementations, the series of acts 1100 may include acts of providing a reference image including an image attribute to the digital image layout neural network wherein the edited semantic layout includes a semantic area corresponding to the image attribute and generating the refined digital image utilizing the digital image layout neural network by modifying the digital image to incorporate the image attribute from the reference image.

In a number of implementations, the series of acts 1100 may include determining a semantic layout of the digital image utilizing a semantic segmentation neural network and determining the edited semantic layout of the digital image based on modifying the semantic layout of the digital image. In some implementations, the series of acts 1100 may include generating the image mask corresponding to the edited semantic layout by determining non-overlapping areas between the semantic layout of the digital image and the edited semantic layout of the digital image and dilating or enlarging the non-overlapping areas by a predetermined amount.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the semantic layout system to generate and utilize the semantic layout manipulation neural network, as described herein.

Implementations of the present disclosure may comprise or utilize a special-purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

The computer-readable media may be any available media that is accessible by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure may comprise at least two distinctly different kinds of computer-readable media: non-transitory computer-readable storage media (devices) and transmission media.

Non-transitory computer-readable storage media (devices) includes RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which may be used to store desired program code means in the form of computer-executable instructions or data structures and which is accessible by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media may include a network and/or data links that are used to carry desired program code means in the form of computer-executable instructions or data structures and that are accessed by a general-purpose or special-purpose computer. Combinations of the above should also be included within the scope of computer-readable media.

Further, upon reaching various computer system components, program code means in the form of computer-executable instructions or data structures may be transferred automatically from transmission media to non-transitory computer-readable storage media (devices) (or vice versa). For example, computer-executable instructions or data structures received over a network or data link may be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) may be included in computer system components that also (or even primarily) utilize transmission media.

Computer-executable instructions comprise, for example, instructions and data which, when executed by a processor, cause a general-purpose computer, special-purpose computer, or special-purpose processing device to perform a certain function or group of functions. In some implementations, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure may also be implemented in cloud computing environments. As used herein, the term "cloud computing" refers to a model for enabling on-demand network access to a shared pool of configurable computing resources. For example, cloud computing may be employed in the marketplace to offer ubiquitous and convenient on-demand access to the shared pool of configurable computing resources. The shared pool of configurable computing resources may be rapidly provisioned via virtualization and released with low management effort or service provider interaction, and then scaled accordingly.

A cloud-computing model may be composed of various characteristics such as, for example, on-demand self-service, broad network access, resource pooling, rapid elasticity, measured service, and so forth. A cloud-computing model may also expose various service models, such as, for example, Software as a Service ("SaaS"), Platform as a Service ("PaaS"), and Infrastructure as a Service ("IaaS"). A cloud-computing model may also be deployed using different deployment models such as private cloud, community cloud, public cloud, hybrid cloud, and so forth. In addition, as used herein, the term "cloud-computing environment" refers to an environment in which cloud computing is employed.

Figure 12:
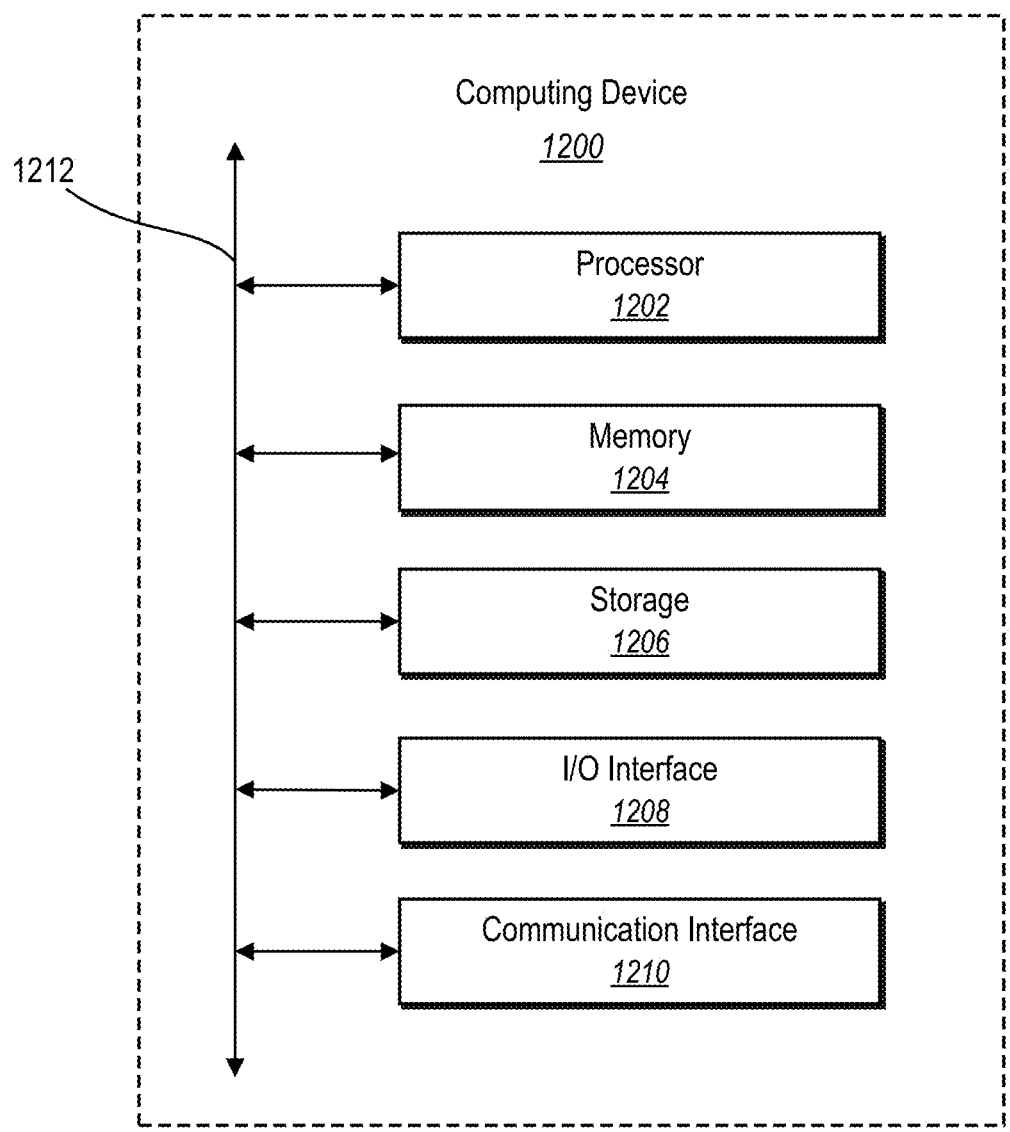
FIG. 12 illustrates a block diagram of an example computing device for implementing one or more implementations of the present disclosure.

FIG. 12 illustrates a block diagram of an example computing device 1200 that may be configured to perform one or more of the processes described above. One will appreciate that one or more computing devices, such as client device 102, server device 108, or the computing devices 600, 1000. In one or more implementations, the computing device 1200 may be a non-mobile device (e.g., a desktop computer, a server device, a web server, a file server, a social networking system, a program server, an application store, or a content provider). Further, the computing device 1200 may be a server device that includes cloud-based processing and storage capabilities. In some implementations, the computing device 1200 may be a mobile device (e.g., a laptop, a tablet, a smartphone, a mobile telephone, a camera, a tracker, a watch, a wearable device, etc.).

As shown in FIG. 12, the computing device 1200 may include one or more processor(s) 1202, memory 1204, a storage device 1206, input/output ("I/O") interfaces 1208, and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other implementations. Furthermore, in certain implementations, the computing device 1200 includes fewer components than those shown in FIG. 12. Components of the computing device 1200 shown in FIG. 12 will now be described in additional detail.

In particular implementations, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include volatile and/or non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 may include a non-transitory storage medium described above. The storage device 1206 may include a hard disk drive (HDD), flash memory, a Universal Serial Bus (USB) drive, or a combination of these or other storage devices.

As shown, the computing device 1200 includes one or more I/O interfaces 1208, which are provided to allow a user to provide input to (e.g., user strokes), receive output from, and otherwise transfer data to and from the computing device 1200. These I/O interfaces 1208 may include a mouse, keypad, or a keyboard, a touch screen, camera, optical scanner, network interface, modem, other known I/O devices, or a combination of these I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 1208 are configured to provide graphical data to a display for presentation to a user. The graphical data may be representative of one or more graphical user interfaces and/or any other graphical content as may serve a particular implementation.

The computing device 1200 may further include a communication interface 1210. The communication interface 1210 may include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 may further include a bus 1212. The bus 1212 may include hardware, software, or both that connects components of computing device 1200 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with fewer or more steps/acts or the steps/acts may be performed in differing orders. Additionally, the steps/acts described herein may be repeated or performed in parallel to one another or parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
generating a first feature map from an input digital image and a second feature map from a semantic layout;
determining, utilizing a sparse attention warped image neural network, a sparse correspondence mapping between a subset of features of the first feature map and features of the second feature map by:
determining feature matching pairs based on feature matching scores between the subset of features of the first feature map and features of the second feature map,
generating, from the feature matching pairs, a sparse point set by determining feature matching pairs having feature matching scores that satisfy a feature matching threshold value; and
generating, from the sparse point set, the sparse correspondence mapping having at least a threshold resolution;
generating, utilizing the sparse correspondence mapping and the feature matching scores, a warped image that includes content of the input digital image aligned to the semantic layout; and
generating a refined digital image from the warped image utilizing a semantic encoding neural network.

2. The computer-implemented method of claim 1, wherein determining the sparse correspondence mapping comprises mapping fewer than a threshold number of features from the first feature map to the features of the second feature map.

3. The computer-implemented method of claim 1, wherein determining the sparse correspondence mapping between the subset of features of the first feature map and the features of the second feature map comprises utilizing a patch matching algorithm to map a feature of the semantic layout to one or more features of the input digital image.

4. The computer-implemented method of claim 1, wherein determining a sparse correspondence map further comprises the sparse correspondence mapping having a threshold resolution of at least 264×264 pixels.

5. The computer-implemented method of claim 1, wherein generating the refined digital image from the warped image utilizing the semantic encoding neural network comprises generating content for masked regions corresponding to changes between the semantic layout and the input digital image.

6. The computer-implemented method of claim 5, wherein generating the content for the masked regions corresponding to changes between the semantic layout and the input digital image comprises generating the content to be both: spatially aligned with the semantic layout and harmonized with neighboring regions from the input digital image.

7. The computer-implemented method of claim 5, wherein generating the refined digital image from the warped image utilizing the semantic encoding neural network comprises:
   utilizing an encoder to extract features from the warped image; and
   utilizing coarse-to-fine refinement network to refine the warped image utilizing the features extracted from the warped image.

8. The computer-implemented method of claim 7, wherein utilizing the encoder to extract features from the warped image comprises extracting multi-scale features from the warped image.

9. A non-transitory computer-readable medium storing executable instructions which, when executed by a processing device, cause the processing device to perform operations comprising:
   determining, utilizing a sparse attention warped image neural network, a sparse correspondence mapping between a subset of features of an input digital image and features of a semantic layout by:
      determining feature matching pairs based on feature matching scores between the subset of features of the input digital image and features of the semantic layout;
      generating, from the feature matching pairs, a sparse point set by determining feature matching pairs having feature matching scores that satisfy a feature matching threshold value; and
      generating, from the sparse point set, the sparse correspondence mapping having at least a threshold resolution;
   generating, utilizing the sparse correspondence mapping and the feature matching scores, a warped image that includes content of the input digital image aligned to the semantic layout; and
   generating a refined digital image from the warped image utilizing a semantic encoding neural network.

10. The non-transitory computer-readable medium of claim 9, wherein generating the refined digital image from the warped image utilizing the semantic encoding neural network comprises generating the refined digital image to include a style of the input digital image and a structure of the semantic layout.

11. The non-transitory computer-readable medium of claim 9, wherein determining the sparse correspondence mapping between a subset of features of the input digital image and features of the semantic layout comprises utilizing a patch matching algorithm to map a feature of the semantic layout to a subset of features of the input digital image.

12. The non-transitory computer-readable medium of claim 9, wherein generating the refined digital image from the warped image utilizing the semantic encoding neural network comprises refining and harmonizing the warped image.

13. The non-transitory computer-readable medium of claim 9, wherein generating the refined digital image from the warped image utilizing the semantic encoding neural network comprises generating content for masked regions corresponding to changes between the semantic layout and the input digital image.

14. The non-transitory computer-readable medium of claim 13, wherein generating the content for the masked regions corresponding to changes between the semantic layout and the input digital image comprises generating the content to be both: spatially aligned with the semantic layout and harmonized with neighboring regions from the input digital image.

15. The non-transitory computer-readable medium of claim 9, wherein generating the refined digital image from the warped image utilizing the semantic encoding neural network comprises:
   utilizing an encoder to extract features from the warped image; and
   utilizing coarse-to-fine refinement network to refine the warped image utilizing the features extracted from the warped image.

16. A system comprising:
   one or more memory devices; and
   one or more processors coupled to the one or more memory devices, the one or more processors configured to cause the system to:
      determine, utilizing a sparse attention warped image neural network, a sparse correspondence mapping between a subset of features of an input digital image and features of a semantic layout by:
         determining feature matching pairs based on feature matching scores between the subset of features of the input digital image and the features of the semantic layout,
         generating, from the feature matching pairs, a sparse point set by determining feature matching pairs having feature matching scores that satisfy a feature matching threshold value; and
         generating, from the sparse point set, the sparse correspondence mapping having at least a threshold resolution;
      generate, utilizing the sparse correspondence mapping and the feature matching scores, a warped image that includes content of the input digital image aligned to the semantic layout; and
      generate a refined digital image from the warped image utilizing a semantic encoding neural network by:
         utilizing an encoder to extract features from the warped image; and
         utilizing coarse-to-fine refinement network to refine the warped image based on the features extracted from the warped image.

17. The system of claim 16, wherein the one or more processors are further configured to cause the system to generate the refined digital image from the warped image utilizing the semantic encoding neural network by generating content for one or more masked regions corresponding to changes between the semantic layout and the input digital image.

18. The system of claim 17, wherein generating the content for one or more masked regions corresponding to changes between the semantic layout and the input digital image comprises refining and harmonizing portions of the warped image corresponding to the one or more masked regions.

19. The system of claim 17, wherein generating the content for the one or more masked regions corresponding to changes between the semantic layout and the input digital image comprises generating the content to be both: spatially aligned with the semantic layout and harmonized with neighboring regions from the input digital image.

20. The system of claim 16, wherein the one or more processors are further configured to cause the system to generate the refined digital image from the warped image utilizing the semantic encoding neural network by generating the refined digital image to include a style of the input digital image and a structure of the semantic layout.

* * * * *